United States Patent [19] Komaki et al.

[11] 4,394,737

[45] Jul. 19, 1983

[54] METHOD OF PROCESSING RADIOGRAPHIC IMAGE

[75] Inventors: Takao Komaki; Seiji Matsumoto, both of Minami-ashigara, Japan

[73] Assignee: Fuji Photo Film Co., Ltd., Kanagawa, Japan

[21] Appl. No.: 168,802

[22] Filed: Jul. 11, 1980

[30] Foreign Application Priority Data

| | | | |
|---|---|---|---|
| Jul. 11, 1979 | [JP] | Japan | 54-87793 |
| Jul. 11, 1979 | [JP] | Japan | 54-87796 |
| Jul. 11, 1979 | [JP] | Japan | 54-87797 |

[51] Int. Cl.[3] .......... G06F 15/42

[52] U.S. Cl. .......... 364/414; 378/62; 378/98; 378/174; 250/327.2

[58] Field of Search .......... 250/327.1, 486, 320, 250/323; 364/414, 515

[56] References Cited

U.S. PATENT DOCUMENTS

| | | | |
|---|---|---|---|
| 1,609,703 | 12/1926 | Eggert | 250/323 |
| 3,988,602 | 10/1976 | Gorsica, Jr. | 364/515 |
| 4,216,526 | 8/1980 | Karwowski | 250/363 R |
| 4,276,473 | 6/1981 | Kato et al. | 250/327.1 |

OTHER PUBLICATIONS

"Improving Low-Illumination Video", NASA Tech. Briefs, Spring, 1979, p. 18.

*Primary Examiner*—Alfred E. Smith
*Assistant Examiner*—Carolyn E. Field
*Attorney, Agent, or Firm*—Gerald J. Ferguson, Jr.; Joseph J. Baker

[57] ABSTRACT

In radiography, a plurality of radiographic films are used for recording radiographic images of an object viewed from the same direction. For instance, a stack of radiographic films stacked together with intensifying screens is exposed to X-rays passing through an object to record the images on the films simultaneously. Alternatively, the plurality of radiographic films are exposed to X-rays passing through the object one by one with the object held still at a position. The images on the plurality of radiographic films are superposed together by electrical signal processing means to obtain an image having averaged density. Then, the gradient of the gradation of the averaged image is enhanced. The radiographic films may be stacked together with self-supporting intensifying screens to reduce the thickness of the stack of the films and intensifying screens when recording the radiographic images. Further, double-side coated intensifying screens may be used together with the stack of the films to reduce the thickness of the stack of the films and intensifying screens when recording the radiographic images.

13 Claims, 26 Drawing Figures

METHOD OF PROCESSING RADIOGRAPHIC IMAGE

BACKGROUND OF THE INVENTION

1. Field of the Invention

This invention relates to a method of processing a radiographic image, and more particularly to a method of improving the signal-to-noise ratio (hereinafter referred to simply as S/N ratio) of a radiographic image for diagnostic purposes to improve the diagnostic efficiency and accuracy thereof.

2. Description of the Prior Art

The radiographic image for diagnostic purposes is a visible image recorded on a radiographic film by use of intensifying screens which represent the difference in X-ray absorption of an object to be diagnosed in the difference in optical density. The radiographic image is subjected to the analysis and diagnosis by doctors or radiologists.

When the radiographic image is used for the purpose of diagnosis, it is required to detect the very minute difference in X-ray absorption of the object to be diagnosed. The ability of detecting the minute difference in X-ray absorption is represented by contrast detecting power of the radiographic image recording system. Since the difference in X-ray absorption between the various parts of the object to be diagnosed like a human body is very small, the contrast detecting power is usually insufficient due to various kinds of noise inherent in the radiographic image recording system.

Heretofore, as the causes of lowering the contrast detecting power in the radiographic image for diagnostic purposes, there have been mainly known the noise caused by the X-ray quantum mottle and the scattering X-rays from the object. Therefore, it is expected that the contrast detecting power can be increased by removing the above two causes. According to the investigations conducted by the present inventors, however, it has been proved that the contrast detecting power cannot be increased simply by removing said two causes. In other words, even if a radiographic image was made by exposing a radiographic film to X-rays having dose of 10 to 100 times as large as that of the X-rays used in the normal radiographic image recording step for reducing the X-ray quantum mottle, the contrast detecting power was not improved materially through the noise due to the X-ray quantum mottle was markedly reduced as compared with the conventional radiographic image. Further, even if a radiographic image was made by use of a slit recording method as disclosed in Japanese unexamined Patent Publication No. 54(1979)-121043 in order to reduce the amount of scattering X-rays, the contrast detecting power was not improved substantially.

SUMMARY OF THE INVENTION

It is therefore an object of the present invention to provide a method of processing a radiographic image for markedly improving the contrast detecting power in a radiographic image recording system.

Another object of the present invention is to provide a method of processing a radiographic image in which the diagnostic efficiency and accuracy of the radiographic image is markedly improved.

The above objects are accomplished by recording radiographic images of an object viewed from the same direction on a plurality of radiographic films, superposing the images on the plurality of radiographic films to obtain an image having averaged density, and enhancing the gradient of gradation of the image.

By averaging the plurality of images of the same object, the various noises of the radiographic image such as uneven density caused by fluctuation of the X-ray intensity, X-ray quantum mottle, structure mottle of intensifying screens, uneven density caused by developing process of the radiographic film and so forth are reduced. However, only by superposing the images and averaging the density thereof, the contrast detecting power is not much improved.

Then, the present invention is characterized in that the averaged image is subjected to a processing of enhancing the gradient of the gradation thereof. The enhancement of the gradient of gradation of the averaged image may be made for the whole image or only for a particular frequency range above a super-low frequency. The enhancement of the gradient of gradation above the super-low frequency can be made by an unsharp masking process.

With the processing of enhancing the gradient of gradation solely, the noise is rather increased and the diagnostic efficiency and accuracy are not improved. In the former case the noise of the whole image is increased, and in the latter case the noise in the high frequency range is increased. Thus, the present invention is characterized in that the image superposition and the gradient enhancement are combined together to improve the diagnostic efficiency and accuracy of the radiographic image.

With the enhancement of the gradient of gradation, the difference in density visually sensed is enlarged and consequently the contrast detecting power is improved. In other words, by the combination of the enhancement of contrast and the reduction of noise by superposition of images, the diagnostic efficiency and accuracy of the radiographic image are improved and accordingly it becomes possible to make proper diagnosis for various kinds of diseases, for example, cancer in the initial stage which have been difficult to find out by the diagnosis based on the conventional radiographic images.

Among the above mentioned two types of gradient enhancing processing, the former process in which the gradient of the whole image is enhanced is effective for relatively large images or images having a vague contour such as the images of cancer, abscess and liver. The latter process in which the gradient is enhanced for the particular frequency range above the super-low frequency is effective for relatively small images or images having a clear contour such as blood vessel, calcification image and diseased bones. These two types of process can be combined together when desired.

Further, in recording the plurality of radiographic images on a plurality of radiographic films, it is possible to use a slit recording method employing a slit. According to the tests conducted by the present inventors, it was confirmed that the slit recording method was suitable for the present invention and the contrast detecting power was further improved thereby. This is considered to be based on the fact that the scattering X-rays are eliminated by the slit and the sharpness of the image is enhanced thereby.

Furthermore, as the film used in recording the radiographic images in this invention, it is possible to use radiographic film of soft gradation in place of the ordinary radiographic film. In the present invention in which the images are superposed, the latitude for the exposure to X-rays can be made large when the film of soft gradation is used. In other words, the radiographic film of soft gradation is advantageous in that image information useful for diagnosis can be obtained for whole the image including parts showing greatly different transmittance of an object. Further, since the noise is reduced by superposing the images, it becomes possible to see the very minute difference in X-ray absorption which has been impossible to see by the conventional radiographic image by enhancing the gradient of gradation of the image recorded on the film of soft gradation. Thus, an image of high diagnostic efficiency and accuracy can be obtained.

As the enhancement of the gradient of gradation or contrast emphasis of the radiographic image, it is desirable to emphasize the spatial frequency component in the range of 0.01 to 1.0 cycle/mm for improve the contrast detecting power over a wide range of spatial frequency. The radiographic film of soft gradation referred to here means a radiographic film in which the gradient $\gamma$ (gamma) is as small as 0.3 to 1.5 whereas that of the ordinary film is 2.0 to 4.0.

DESCRIPTION OF THE PREFERRED EMBODIMENTS

Now the present invention will be described in detail with reference to particular embodiments thereof. The present invention will hereinbelow be described mainly with reference to three embodiments thereof. One of the embodiments employs a radiographic film superposed with ordinary intensifying screens. Another embodiment employs a radiographic film superposed with self-supporting intensifying screens for reducing the total thickness of a stack of the films and the intensifying screens and improving the sharpness of the radiographic images. Still another embodiment employs a radiographic film superposed with double-side coated intensifying screens for reducing the total thickness of a stack of the films and the intensifying screens and improving the sharpness of the radiographic images.

Figure 1A:
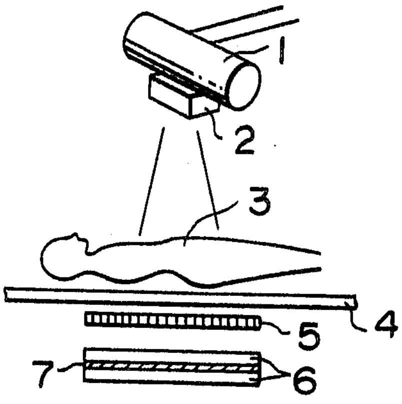
FIG. 1A is a side view showing the radiographic image recording step in an embodiment of the present invention.

Referring to FIG. 1A showing the radiographic image recording step in one embodiment of the present invention, an X-ray tube 1 emits X-rays through a multiple iris diaphragm 2 upon an object 3 like abdomen of a human body placed on a table 4. Under the table 4 is provided a grid 5 for eliminating scattering rays. Under the grid 5 is located a radiographic film 7 sandwiched between a pair of intensifying screens 6. The radiographic film 7 is an ordinary X-ray film which will hereinbelow be referred to simply as "film".

In this embodiment shown in FIG. 1A, a number of films 7 are exposed to the X-rays through the same object 3 one by one. In order to record the same object on the number of films 7 in the same size and at the same position so that the recorded image will perfectly be registered with each other, it is possible to use an automatic successive photographing device which is able to automatically record a number of images in a short period.

Figure 1B:
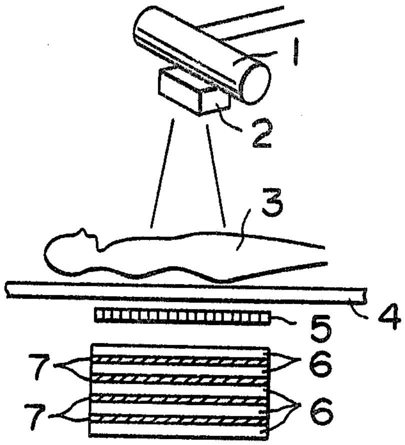
FIG. 1B is a side view showing the radiographic image recording step in another embodiment of the present invention.

Further, it is possible to record the same object on a plurality of films 7 by stacking a plurality of films 7 together with intensifying screens 6 as shown in FIG. 1B. In FIG. 1B, all the elements equivalent to those shown in FIG. 1A are designated by the same reference numerals. Though the number of the plurality of films 7 is desired to be as large as possible theoretically, it cannot be made too large for the following reasons. In case of the former method in which the plurality of films 7 are exposed to X-rays one by one, the object cannot help being exposed to too large a dose of X-rays. In case of the latter method in which the plurality of films 7 are stacked together to be exposed to X-rays at once, it is necessary to make the intensity of the X-rays higher in order to record the image of the object in sufficient density on so large a number of films. This is, however, very difficult in practice. Accordingly, from the practical viewpoint the number (n) of the plurality of films 7 is desired to be $2 \leqq n \leqq 8$, preferably $3 \leqq n \leqq 6$.

From the viewpoint of safety, it is desirable to record the plurality of images at once on a stack of films 7 and reduce the dose of X-rays to which the object 3 is exposed. In this case, a plurality of films 7 are stacked together with intensifying screens and retained in a cassette and exposed at once to X-rays passing through the object 3. In this method, however, due to the large thickness of the stack of the films the distance of the films from the object is considerably independent for every plate. Accordingly, there is likely a problem that the size of the recorded images on the different films are different from each other due to the different distance from the object and the diverging X-rays from a point source. The difference in size of the recorded images results in imperfect registration of the corresponding recorded images when superposed through an image processing system, which results in lowering in the sharpness of the processed image. Particularly in case of recording a tomographic image, the angle at which the X-rays impinge upon the films is large and the imperfectness of registration of the images becomes prominent and the finally obtained image will be blurred to a great extent.

In such a case, it is desirable to use self-supporting phosphor sheets in place of the ordinary intensifying screens 6 in which a phosphor layer is applied on a substrate. By stacking the self-supporting type phosphor sheets composed of a layer of a binder having self-supporting property containing dispersed therein stimulable phosphor particles, the total thickness of the stack of films and the phosphor sheets can be made small and the possibility of imperfect registration of images of blur in the superposed image can be markedly reduced.

As the binder for the self-supporting phosphor sheet can be used any type of resin which provides a self-supporting film when hardened. For instance, polyvinyl resins (e.g. polyvinyl alcohol, polyvinyl acetal, polyvinyl acetate), polyurethane resins (both of polyester resin and polyether resin) vinylchloride-vinylacetate copolymer resins, acetate resins (e.g. triacetate cellulose), cellulose resins (e.g. triacetyl cellulose, nitrocellulose) and so forth can be used as the binder. The thickness of the self-supporting phosphor sheet should be 70–300μ, preferably 100–150μ. The mixing ratio of the binder to the phosphor is preferably selected within the range of 1:5 to 1:10 (binder:phosphor) though it is not limited thereto.

The self-supporting phosphor sheet can be made by a well known method of forming a sheet by use of the above described materials. For instance, a mixture of said binder and the stimulable phosphor mixed by use of a proper volatile solvent is casted on a flat plate having small adhesion to the binder and the casted layer is peeled off the plate, which is known as flow casting.

Further, the self-supporting phosphor sheet may be provided on one surface or both surfaces thereof a protective layer of polyethylene terephthalate having a thickness of 5 to 20μ in order to reinforce the mechanical strength thereof. The protective layer may be provided with color like gray in order to prevent diffusion of visible light and prevent blur of image.

Figure 1C:
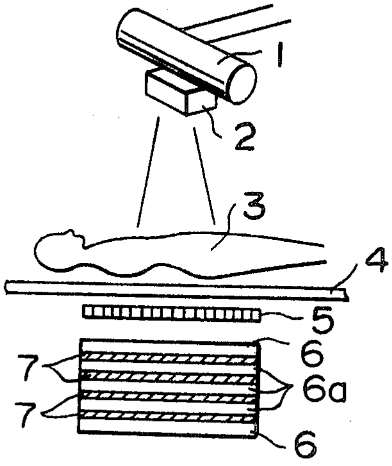
FIG. 1C is a side view showing the radiographic image recording step in still another embodiment of the present invention.

Furthermore, in the radiographic image recording step, it is possible to use double-side coated intensifying screens in place of the ordinary intensifying screens 6 or the self-supporting phosphor sheet as described above. The double-side coated intensifying screen is composed of a substrate and phosphor layers applied on both surfaces thereof. In more detail, in case that the double-side coated intensifying screens are used, the double-side coated intensifying screens *6a* are sandwiched between the films 7 and ordinary intensifying screens 6 having only one phosphor layer on one surface thereof are placed on the uppermost film 7 and beneath the lowermost film 7 as shown in FIG. 1C. The ordinary intensifying screens 6 are of course stacked with the films 7 and the double-side coated intensifying screens *6a* with the phosphor layer thereof faced inward and put in contact with the uppermost and lowermost films 7 as shown.

The substrate of the double-side coated intensifying screens may be of any material having high transmittance to X-rays preferably a high molecular weight compounds such as polyethylene terephthalate and cellulose acetate, or paper. The thickness of the substrate is preferably within a range of 70 to 250μ in view of the total thickness which should not be made too large and the strength of the intensifying screen itself.

On the opposite surfaces of the substrate is applied a coating solution of a phosphor dispersed in a proper binder. The thickness of the phosphor layer is also desired to be within the range of about 70 to about 250μ in view of the total thickness desired to be made small and the intensity of the light emitted therefrom upon exposure to X-rays. The mixing ratio of the binder to the phosphor is selected within the range of 1:5 to 5:1 (binder:phosphor) though it is not strictly limited thereto. As the binder for the phosphor layer of the double-side coated intensifying screen is desired a material which provides a film or layer hardly absorbing the light emitted from the phosphor particles when dried. For instance, synthetic high molecular weight compounds such as polyvinyl alcohol, polyvinyl acetate, polyvinyl acetal, nitrocellulose, ethyl cellulose and cellulose acetate, or natural high molecular compound like gelatin can be employed as the binder.

As the phosphor used for the double-side coated intensifying screen can be used any known phosphors which emits light upon exposure to X-rays. Among the known phosphors, calcium tungstate phosphors, barium sulfate phosphors, gadolinium oxysulfide phosphors, and mixtures of these phosphors can be preferably used because of their high intensity of emission of light upon exposure to X-rays.

The double-side coated intensifying screens used in this invention may have a protective layer or light reflecting layer beside the phosphor layers.

The detailed combination of the films 7 and the intensifying screens 6 stacked together will be described with reference to FIGS. 2A to 2D for the above described various embodiments.

Figure 2A:
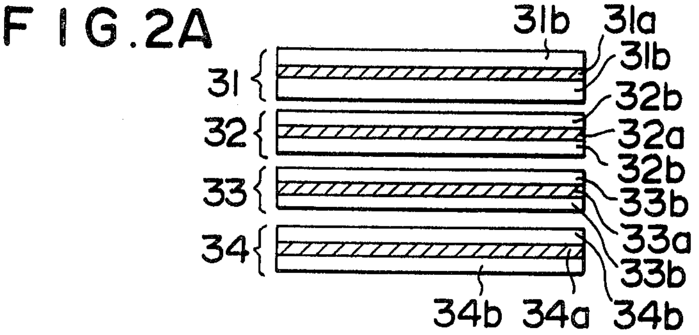
FIG. 2A is a cross-sectional view showing a stack of radiographic films and intensifying screens used in an embodiment of the present invention.

FIG. 2A shows a stack of ordinary combinations of the films and the intensifying screens. Four films 31*a*, 32*a*, 33*a* and 34*a* are sandwiched between four pairs of intensifying screens 31*b*, 32*b*, 33*b* and 34*b*, respectively. Four combinations 31, 32, 33 and 34 of the films 31*a*–34*a* and the intensifying screens 31*b*–34*b* are simply stacked together and exposed to X-rays. The sensitivity of the combinations 31–43 is changed like 1, 1.5, 2 and 4, respectively, to provide radiographic images of substantially the same density.

Figure 2B:
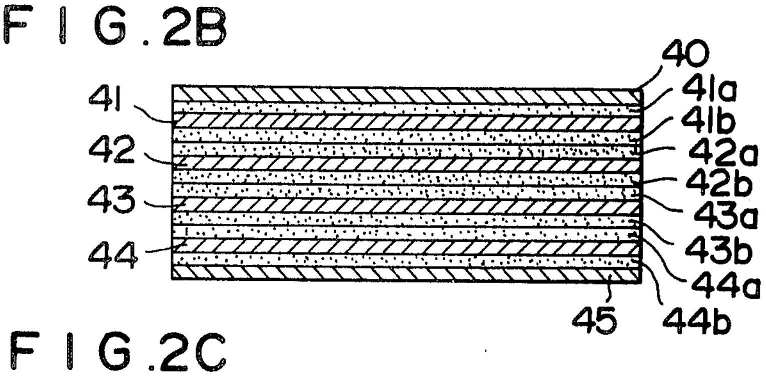
FIGS. 2B and 2C are cross-sectional views showing examples of a stack of radiographic films and intensifying screens used in another embodiment of the present invention.

FIG. 2B shows a stack of films 41, 42, 43 and 44 and self-supporting phosphor sheets 41*b*,42*a*,42*b*,43*a*,43*b* and 44*a* sandwiched therebetween and ordinary intensifying screens having phosphor layers 41*a* and 44*b* on substrates 40 and 45, respectively. The first film 41 is sandwiched between the phosphor layer 41*a* on the substrate of 40 and the self-supporting phosphor sheet 41*b*, the second film 42 is sandwiched between a pair of self-supporting phosphor sheets 42*a* and 42*b*, the third film 43 is sandwiched between a pair of self-supporting phosphor sheets 43*a* and 43*b*, and the fourth film 44 is sandwiched between the self-supporting phosphor sheet 44*a* and the phosphor layer 44*b* on the substrate 45.

In the embodiment as shown in FIG. 2B, the sensitivity of the phosphor layer 41*a* and the self-supporting phosphor sheet 41*b* sandwiching the first film 41 is made 1 in the relative value, the sensitivity of the self-supporting phosphor sheets 42*a* and 42*b* sandwiching the second film 42 is made 1.5, the sensitivity of the self-supporting phosphor sheets 43*a* and 43*b* sandwiching the third film 43 is made 2.5 and the sensitivity of the self-supporting phosphor sheet 44*a* and the phosphor layer 44*b* sandwiching the fourth film 44 is made 4 so that the radiographic images recorded on the four films 41, 42, 43 and 44 may have substantially the same density.

Figure 2C:
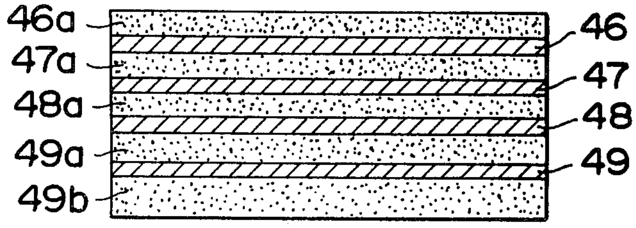

FIG. 2C shows a stack of four films 46, 47, 48 and 49 and five self-supporting phosphor sheets 46*a*, 47*a*, 48*a*, 49*a* and 49*b* sandwiching the four films 46–49. The sensitivity of the five self-supporting phosphor sheets 46*a*–50*b* is made 1, 1.5, 2.2, 3.5 and 6, respectively so that the four films 46–49 will have radiographic images of substantially the same density.

In the embodiments shown in FIGS. 2B and 2C in which the self-supporting phosphor sheets 41*b*–44*a* and 46*a*–49*b* are used, the total thickness of the stack can be made smaller and accordingly the imperfect registration between images on the different films can be markedly reduced and the sharpness of the image can be improved.

Particularly in the embodiment shown in FIG. 2B in which the films 41–44 are sandwiched between separate pairs of self-supporting phosphor sheets, the sensitivity effecting on the films 41–44 can be freely selected independently. From this viewpoint, the embodiment as shown in FIG. 2B is preferred to the embodiment as shown in FIG. 2C in making the density of the images recorded on the films 41–44 as equal as possible.

Figure 2D:
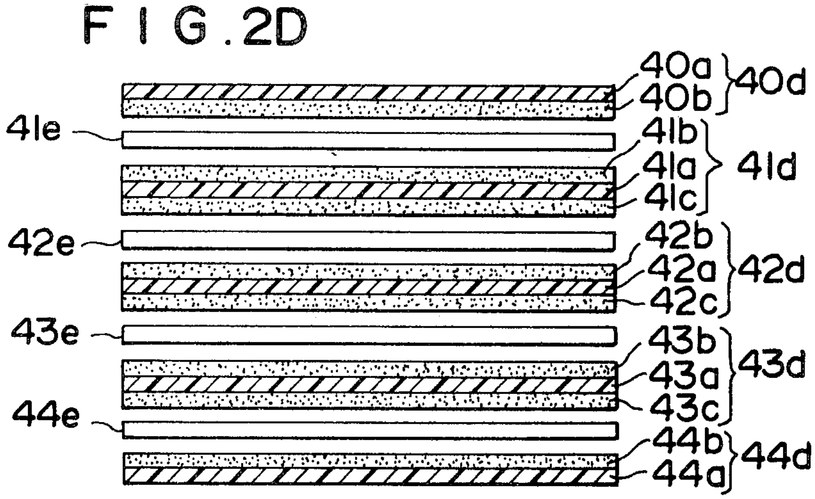
FIG. 2D is a cross-sectional views showing an example of a stack of radiographic films and intensifying screens used in still another embodiment of the present invention.

FIG. 2D shows a stack of films 41*e*, 42*e*, 43*e* and 44*e*, double-side coated intensifying screens 41*d*, 42*d* and 43*d* sandwiched between the films 41*e*–44*e*, and ordinary intensifying screens 40*d* and 44*d* having a phosphor layer 40*b* and 44*b* on substrates 40*a* and 44*a* respectively. The uppermost film 41*e* is sandwiched between the ordinary intensifying screen 40*d* and the first double-side coated intensifying screen 41*d*, the second film 42*e* is sandwiched between a pair of double-side coated intensifying screens 41*d* and 42*d*, the third film 43*e* is sandwiched between a pair of double-side coated intensifying screens 42*d* and 43*d*, and the fourth film 44*e* is sandwiched between the third double-side coated intensifying screen 43*d* and the ordinary intensifying screen 44*d*. The three double-side coated intensifying screens 41*d*, 42*d* and 43*d* are all composed of substrates 41*a*, 42*a* and 43*a* and pairs of phosphor layers 41*b*,41*c*; 42*a*,42*c* and 43*a*,43*c*.

As the double-side coated intensifying screens used in the above described embodiment, the following phosphors can be employed for instance. The material and the thickness of the phosphor layers for the double-side coated intensifying screens are shown in Table 1 below.

TABLE 1

| Phosphor layer type | Thickness | Phosphor |
|---|---|---|
| A | 100μ | Calcium tungstate |
| B | 100μ | Calcium tungstate & Barium sulfate |
| C | 100μ | Gadolinium oxysulfide |
| D | 200μ | Gadolinium oxysulfide |

In the above table, the binder used is polyvinyl alcohol, and the mixing weight ratio of the binder to the phosphor is 1:8.

The above described phosphor layers A, B, C and D were used as the phosphor layers in the stack of the double-side coated intensifying screens 41*d*, 42*d* and 43*d* and the ordinary intensifying screens 40*d* and 44*d* as listed in Table 2 below.

TABLE 2

| No. of member from above | Ref. numeral in FIG. 2D | | Phosphor layer type | X-ray film type |
|---|---|---|---|---|
| No. 1 | 40d | 40a | Substrate | |
| | | 40b | A | |
| No. 2 | 41e | | | Regular type |
| No. 3 | | 41b | A | |
| | 41d | 41a | Substrate | |
| | | 41c | B | |
| No. 4 | 42e | | | Regular type |
| No. 5 | | 42b | B | |
| | 42d | 42a | Substrate | |
| | | 42c | C | |
| No. 6 | 43e | | | Green intensified |
| No. 7 | | 43b | C | |
| | 43d | 43a | Substrate | |
| | | 43c | D | |
| No. 8 | 44e | | | Green intensified |
| No. 9 | 44d | 44b | D | |
| | | 44a | Substrate | |

Figure 3:
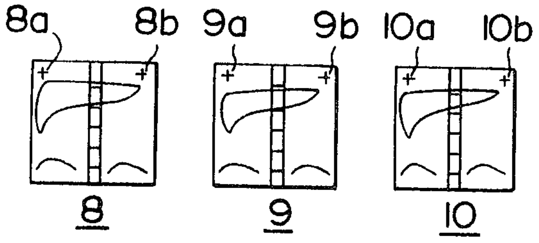
FIG. 3 shows the radiographic images recorded on a plurality of radiographic films in accordance with the method of the present invention.

The radiographic images thus obtained by the recording method as shown in FIGS. 1A, 1B and 1C are shown in FIG. 3. The radiographic images 8, 9 and 10 are obtained by recording the X-ray transmission image of the object 3 on the plurality of films 7 and developing the films 7 through an ordinary photographic developing process. The radiographic images 8, 9 and 10 have registration marks 8*a*, 8*b*, 9*a*, 9*b*, 10*a* and 10*b* as shown for registering the images 8, 9 and 10 for superposition. The registration marks 8*a*, . . . 10*a* may be replaced by any other means for registering the plurality of images.

Figure 4A:
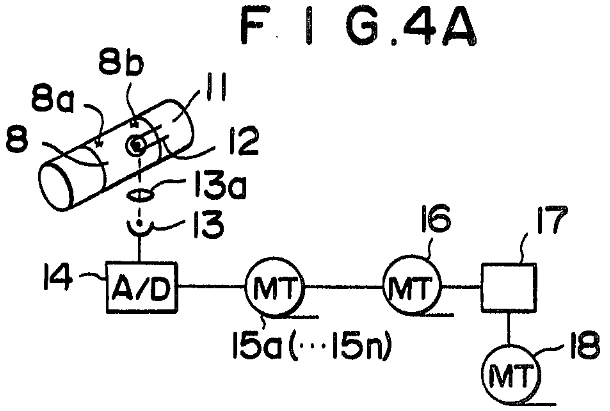
FIG. 4A is a block diagram showing an image read out system for reading out the images recorded in accordance with the method of the present invention.

The plurality of radiographic images 8, 9 and 10 thus obtained are superposed electrically namely by means of an electric signal processing means. An example thereof will be described with reference to FIG. 4A. By the superposing process, the image signals of the plurality of images are averaged into an averaged image signal. Referring to FIG. 4A, one of the radiographic images 8 is mounted on a scanning drum 11 made of a transparent cylinder containing therein a light source 12. The radiographic image 8 is accurately positioned on the drum 11 with the registration marks 8*a* and 8*b* registered with registration marks (not shown) on the drum 11. The image on the drum 11 is scanned and focused on a photodetector 13 by means of the scanning movement of the scanning drum 11 and a focusing lens 13*a* located between the drum 11 and the photodetector 13. The output of the photodetector 13 is sent to an A/D converter 14, the output of which is in turn sent to a magnetic tape 15*a*, . . . 15*n*. The output image signal obtained from the first image 8 is recorded in the first magnetic tape 15*a*, the output image signal obtained from the second image 9 is recorded on the second magnetic tape 15*b*, and the output image signal obtained from the third image 10 is recorded on the third magnetic tape 15*c*. Thus, when n-number of radiographic images 8,9,10, . . . are handled, the output image signals of those images are recorded separately on the n-number of magnetic tapes 15*a*, 15*b*, . . . 15*n*. The image signals thus recorded on the magnetic tapes 15*a*, . . . 15*n* are then superposed by a computer processing and recorded on another magnetic tape 16. The signal thus recorded on the magnetic tape 16 representing the superposed image signals of the n-number of radiographic images 8,9,10, . . . is then processed through a signal processing circuit 17 for calculating the average value of the image signals. The output of the signal processing circuit 17 is recorded on another magnetic tape 18. The average signal thus recorded on the magnetic tape 18 is then subjected to a gradation control for enhancing the gradient of gradation of the image.

Figure 4B:
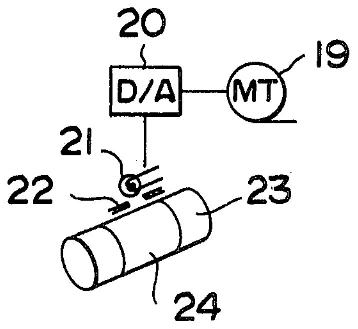
FIG. 4B is a block diagram showing an image reproducing system for reproducing the radiographic image in accordance with the method of the present invention.

The image information thus obtained and finally processed through the gradation control means is used for recording or reproducing a final visible image on a recording material by a recording device as shown in FIG. 4B. Referring to FIG. 4B, said signal finally obtained through the gradation control means is recorded on still another magnetic tape 19. The signal recorded on the magnetic tape 19 is sent to a D/A converter 20, the output of which is sent to a printing light source 21 to control the intensity thereof. The light source 21 emits light impinging upon a photosensitive film 24 mounted on a drum 23 through a slit 22. Thus, a radiographic image having averaged information and enhanced gradient of gradation is recorded on the photosensitive film 24. The recording device may be replaced by any other image recording means in which the processed signal image recorded on the tape 19 is read out and used for recording a visible image according to the read out signal.

The above described superposing process using a computer may be changed to other type of process in which the images on the plurality of films are superposed. For instance, the image information on the plurality of films may be read out and printed on a photosensitive material with a density of 1/n of the original density with the n-number of images superposed on the same photosensitive material so that the finally obtained image will have substantially the same density as that of the original images.

The above described gradation control process for enhancing the gradient of gradation of the averaged image may also be replaced by a different method which does not use a computer. For instance, the averaged image may be printed on a photographic film of high gradation.

In accordance with the present invention as described above, the noise can be markedly reduced without lowering the spatial resolving power. Accordingly, the contrast detecting power can be markedly improved. Therefore, it becomes easy to analyze the radiographic image and perform the diagnostic examination, and accordingly it is prevented to make a wrong diagnosis. Further, in accordance with the present invention the contrast detecting power can be enhanced without increasing the dose of X-rays as compared with the conventional radiographic image recording system.

In the above-described embodiments, the gradient of gradation of the averaged image is enhanced for whole the image. However, it is possible to enhance the gradient of gradation only for a particular frequency range. In other words, it is possible to emphasize the contrast of the image in a spatial frequency range above a super-low frequency. This can be performed by conducting an unsharp masking processing. The unsharp masking processing is described in detail in a copending U.S. patent application Ser. No. 106,734 (now U.S. Pat. No. 4,317,179). In this method, an unsharp masking process represented by a formula of $$D = Dorg + \beta(Dorg - Dus)$$

is conducted, where the product of an emphasis coefficient $\beta$ and a difference between an original density Dorg and an unsharp mask density Dus corresponding to the super-low frequency is added to the original density Dorg.

The unsharp mask density Dus referred to in this invention means a density representing every scanning point which is made by blurring the original image to obtain only the frequency component lower than the super-low frequency. In the unsharp mask corresponding to the unsharp image, the modulation transfer function is not less than 0.5 at the spatial frequency of 0.01 cycle/mm and not more than 0.5 at the spatial frequency of 0.5 cycle/mm.

The maximum value of the modulation transfer function of the image in which the frequency emphasis is conducted according to the above formula is desired to be made 1.5 to 10 times as large as the value of the modulation transfer function near the zero frequency.

In this invention, the emphasis coefficient $\beta$ may be fixed or changed as a function of the original image density (Dorg) or the unsharp mask density (Dus). By changing the emphasis coefficient $\beta$ as a function of the original image density (Dorg) or the unsharp mask density (Dus), the diagnostic efficiency and accuracy are further improved.

Further, since there are much noise in the high frequency region, it is desirable to conduct a smoothing processing on the density D in which the modulation transfer function is not less than 0.5 at the spatial frequency of 0.5 cycle/mm and not more than 0.5 at the spatial frequency of 5 cycle/mm. With this smoothing processing, the noise components are averaged and accordingly the image quality is improved.

Now another embodiment of the present invention in which the unsharp masking processing is performed upon the averaged image will be described hereinbelow referring to FIG. 5.

Figure 5:
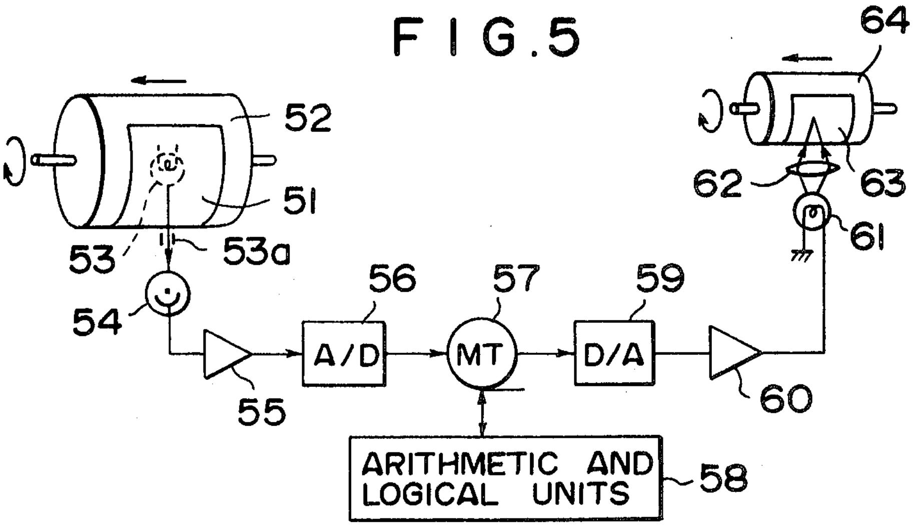
FIG. 5 is a block diagram showing an image processing system for reading out and reproducing the radiographic image in accordance with a further embodiment of the present invention.

Referring to FIG. 5, a hard copy 51 of the image having the averaged density obtained through said process of superposition is mounted on a transparent drum 52. The drum 52 is axially movable and rotatable about its axis for scanning the image of the hard copy 51 mounted thereon. Within the transparent drum 52 is provided a light source 53 for reading out the image of the hard copy 51. The light emitted from the light source 53 is made into a light beam by means of a lens or the like and transmits through the hard copy 51 on the drum 52. It should be understood that the hard copy 51 may be replaced by an X-ray photograph or a similar radiographic image obtained by said image superposing processing.

The light beam passing through the hard copy 51 of the averaged image 51 is received by a photodetector 54 via an aperture 53*a* and converted to an electric signal. The electric signal is amplified through an amplifier 55 and converted to a digital signal by an A/D converter 56 and recorded on a magnetic tape 57. The image information recorded on the magnetic tape 57 is read out by an operating means 58 like a mini-computer and an operation represented by said formula $$D = Dorg + \beta(Dorg - Dus)$$

is performed after the unsharp mask density Dus is obtained, wherein D is the density of the finally obtained image. Instead of the magnetic tape 57, it is possible to use said magnetic tape 18 shown in FIG. 4A. When the magnetic tape 18 is used, the information can be used without being converted to a hard copy, which provides favorable results.

The unsharp mask density Dus should be determined to have a modulation transfer function of not less than 0.5 at the spatial frequency of 0.01 cycle/mm and not more than 0.5 at the spatial frequency of 0.5 cycle/mm.

Further, in processing the signal according to said formula the emphasis coefficient $\beta$ must be specified. These values are externally selected for every object or preselected for several parts of human body or kinds of the radiograph and memorized in a memory of the operating means 58 in advance so as to be simply selected therefrom when the processing is conducted.

For the density D' obtained by the operation or processing as above, the smoothing processing is conducted to reduce the high frequency component. With this smoothing processing, the noise can be reduced without damaging the information necessary for diagnosis.

The emphasis coefficient $\beta$ is desired to be made small for the low density range of the final image and large for the high density range to prevent the formation of an artifact-image which is liable to appear with frequency emphasis.

As one example thereof, when the X-ray image of a stomach (Magen) obtained using a barium sulfate contrast medium is subjected to said frequency emphasis (enhancement of particular spatial frequency components) or the unsharp masking process with the emphasis coefficient $\beta$ fixed, the boundary of the low brightness area having a uniform low brightness over a wide range corresponding to the portion containing the barium sulfate contrast medium is overemphasized and an artifact-image having a double contour will appear. If the emphasis coefficient $\beta$ is changed so that it is made small in the low brightness region for the portion filled with the contrast medium and is made large in the high brightness region for the stomach details or the like, the occurrence of the artifact-image having the double contour can be prevented. Further, in case of the front chest image, if $\beta$ is fixed the noise increases in the low brightness region like the back bone and the heart and in an extreme case the fine portions become only saturated white (the fog level of the recording medium), which disturbs badly the visual observation and markedly lowers the diagnostic efficiency and accuracy. To the contrary, if $\beta$ is made small in the low brightness regions like the backbone or the heart and made large in the high brightness region like the lung, the above mentioned noise and the saturated white areas can be reduced.

In any example of the above types, if the emphasis coefficient $\beta$ is fixed at a small value for the frequency emphasis, the diagnostic efficiency and accuracy are not enhanced since the contrast of the important portions like the stomach details, the blood vessels of the lung and veins is not enhanced although various artifact-images may be prevented. Thus, by changing the emphasis coefficient $\beta$ continuously according to the brightness of the image on the stimulable phosphor, it is possible to obtain a radiation image having high diagnostic efficiency and accuracy controlling the occurrence of the artifact-image.

As one method of changing the emphasis coefficient $\beta$, $\beta$ is changed almost linearly between the maximum density $D_1$ and the minimum density $D_0$ which are obtained from a histogram of the image on the radiographic image. The emphasis coefficient $\beta$ may be changed in a monotonously increasing curve. The maximum and minimum values $D_1$ and $D_0$ are determined according to the sort of the X-ray image to be processed. For instance, the maximum and minimum brightness may be determined as the brightness where the integrated histogram becomes 90 to 100% and 0 to 10%, respectively. Further, according to the inventors' tests, it has been found that the results are almost the same between the emphasis coefficient $\beta$ changed with the original image signal and the changed with the unsharp mask signal.

The degree of emphasis by the frequency processing is determined by the emphasis coefficient $\beta$. It has been found that the value M defined by a formula of $$M = 1.2 \times \beta + 1.0$$

substantially represents the degree of contrast emphasis. The desirable range of the value M is as shown in FIGS. 6A, 6B and 6C for the ordinary, intensifying screens, the self-supporting phosphor sheets, and the double-side coated intensifying screens respectively, as shown in FIGS. 2A, 2C and 2B.

When the emphasis coefficient $\beta$ is desirable to be changed according to the image density, the desirable range of M should be selected as follows.

Figure 6A:
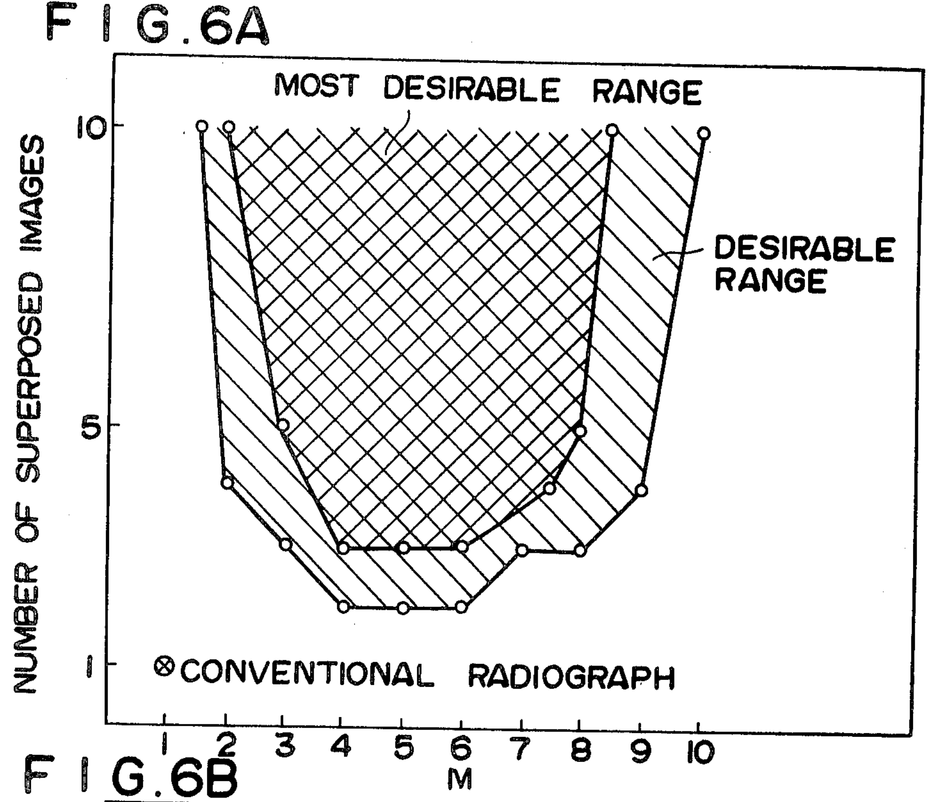
FIG. 6A is a graph showing the relationship of the number of superposed images and the degree of contrast emphasis M with respect to the results of the obtained image in accordance with an embodiment of the present invention.
Figure 6B:
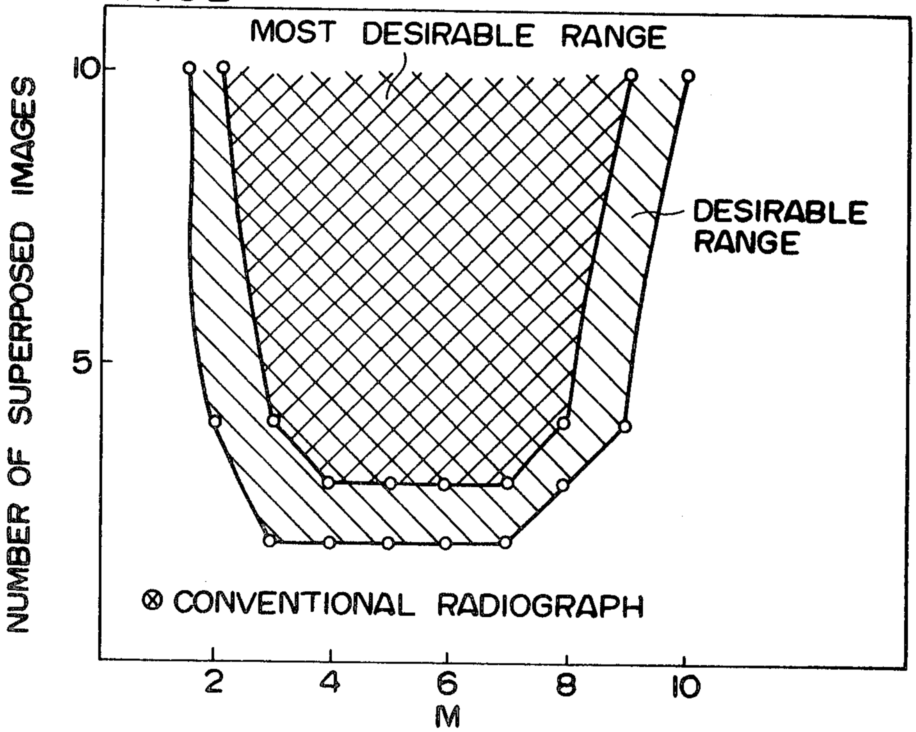
FIG. 6B is a graph similar to FIG. 6A showing the results in accordance with another embodiment of the present invention.
Figure 6C:
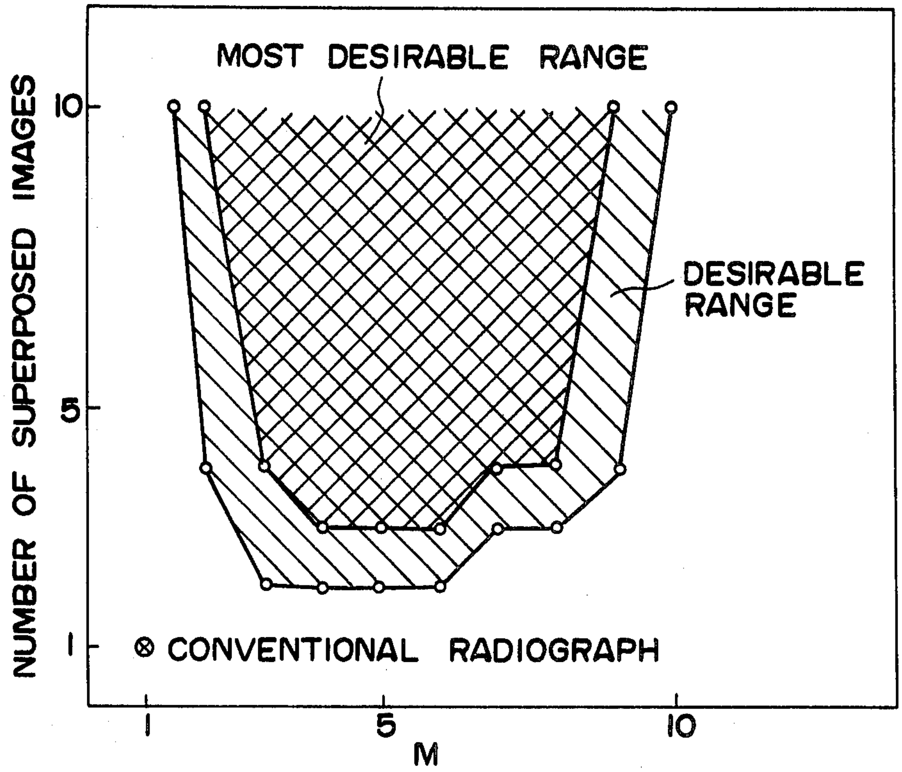
FIG. 6C is a graph similar to FIG. 6A showing the results in accordance with still another embodiment of the present invention.
Figure 11:
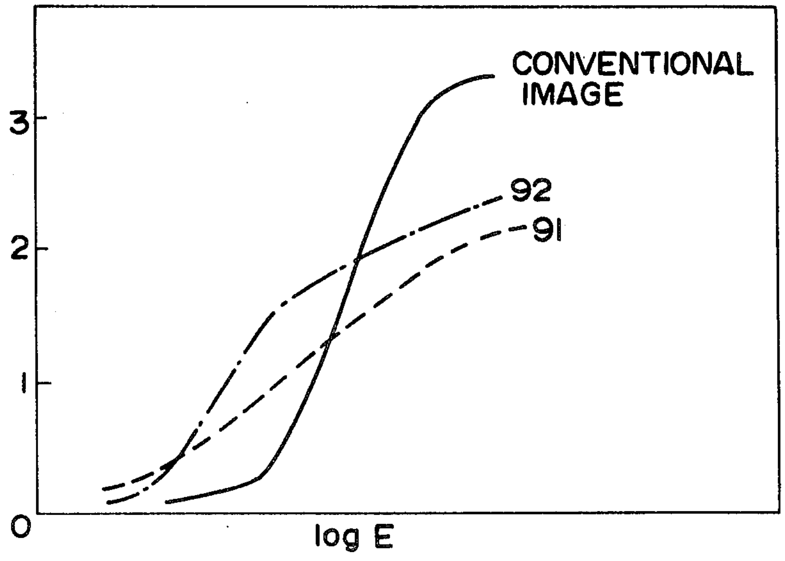
FIG. 11 is a graph showing the characteristic curves of the image obtained in accordance with the present invention employing a radiographic film of soft gradation shown in comparison with the conventional radiographic image.

The M of the image portion which is important for diagnosis should be within the desirable range as shown in FIGS. 6A, 6B and 6C. That is, when the low brightness portion of the image is particularly important for diagnosis, the M which is applied for low bright portion should be selected within the range as shown in FIGS. 6A, 6B and 6C. When the high brightness portion of the image is particularly important for diagnosis, the M should be selected similarly. When whole the image is important, the average value of the M should be selected within the range as shown in FIGS. 6A, 6B and 6C.

In addition to the above mentioned frequency emphasis, it is possible to provide a gradation control processing for changing the gradation of the image. The super-low frequency processing as described above does not have a high effect for images in which the density gently changes over a wide range as of the lung cancer or the mammary cancer. In these images, the diagnostic efficiency and accuracy are improved when the whole gradation is enhanced or the contrast is emphasized together with the whole image gradation enhancement. The gradation control processing may be conducted either before or after the super-low frequency process or the unsharp masking process. If the gradation contol processing is conducted before the unsharp masking process, an A/D conversion is conducted after the signal has been gradation processed with a non-linear analog circuit. If it is conducted after the A/D conversion, a digital process is possible by use of a mini-computer. When the gradation control processing is conducted after the unsharp masking process, the gradation control processing can be conducted in the digital form or may be conducted in the analog form after D/A conversion.

Further, it has been proved that when the frequency emphasis and the gradation control processing are combined desirable results can be obtained if the value M obtained from said formula and the contrast emphasis are within the desirable range in FIGS. 6A, 6B and 6C for said embodiments respectively.

The data thus obtained through the frequency emphasis processing and the gradation control processing when required are recorded on the magnetic tape 57. The data recorded on the magnetic tape 57 are read out and converted to an analog signal by the D/A converter 59 and put into a recording light source 61 after amplified by an amplifier 60.

The light emitted from the recording light source 61 impinges upon a copy film 63 through a lens 62 to print an image on the copy film 63. The copy film 63 is mounted on a printing drum 64 which is rotated and axially moved in synchronization with the transparent drum 52. Thus, a radiographic image with the necessary frequency emphasis and gradation control is reproduced and obtained on the copy film 63.

When the image is reproduced finally on the copy film 63 a size reduced image can be obtained by recording the image with a higher sampling frequency than the frequency at the time of input scanning. For instance, if the input scanning system has a sampling frequency of 10 pixel/mm and the output scanning system has a sampling frequency of 20 pixel/mm, the finally obtained image has a $\frac{1}{2}$ reduced size with respect to the original image size.

The size reduced image having a reduction rate of $\frac{1}{2}$ to $\frac{1}{3}$ is desirable for enhancing further the diagnostic efficiency and accuracy since the frequency component which is necessary for diagnosis becomes close to the frequency at the highest visibility and accordingly the contrast appears to have been raised to the observer.

The present invention is not limited to the above embodiments but may be embodied in a various variations. For instance, it is possible to successively record a plurality of radiographic images on a plurality of radiographic films and the unsharp masking processing is performed after the plurality of images are subjected to the superposing process, or it is possible to record a plurality of radiographic images at once on a plurality of films and the gradation control processing is performed after the images are subjected to the superposing process. Further, the read out of the image recorded on the film can be conducted by use of a flat support in place of the drum. The image on the film or the hard copy may also be scanned optically by a light beam scanning system or a flying spot scanner.

Further, the processing of the unsharp mask can be performed by unsharp masking the analog signal in the primary scanning direction by use of a low-pass filter before the A/D conversion and processing the digital signal only in the sub-scanning direction after the A/D conversion.

Further, though in the above embodiment the digital output of the A/D converter is once memorized on a magnetic tape and the aforesaid operation is conducted based on the memorized output, it is possible to process the signal on real time and directly send the processed signal to the reproduction station. Further, the operation of the unsharp mask signal may be conducted off line after recording the necessary information on a magnetic tape or on line with the information memorized temporarily in core memory.

In the above embodiments, the reproduced image subjected to the image processing is finally recorded on a recording medium or a copying film such as a silver halide photographic film. Other than the silver halide film, however, a diazo film or an electrophotographic recording material can also be used. It is further possible to display the reproduced image on a CRT (Cathode Ray Tube) instead of recording the image on a copying film. Then, it is possible to further record the image displayed on the CRT on a recording film by an optical recording means.

Further, in the above embodiments, an electric signal amplified non-linearly by amplifier after detected by the photodetector is often used as the original image density. The reason why such signal is used is that the signal subjected to the band compression and/or non-linear correction like logarithmic amplification is advantageous to the signal processing. It is, however, of course possible to directly use the output signal of the photodetector as Dorg without any processing. Further, theoretically, the calculation of the unsharp mask density should be based on the energy itself. According to the experiments, however, it has been proved that the mean value obtained based on the log-compressed value corresponding to the density not to the energy showed the same results in the viewpoint of diagnostic efficiency and accuracy. This is practically very convenient and advantageous in conducting the operation.

In accordance with the preferred embodiment as described hereinabove in which the response in a particular frequency range is emphasized, the image information in the emphasized frequency range which is important for diagnosis is emphasized and the contrast detecting power of the image in such a frequency range is improved and accordingly the diagnostic efficiency and accuracy are improved. Further, by changing the degree of emphasis according to the density and shape of the image, the occurence of an artifact-image can be prevented and it is prevented that the diseases important for diagnosis become hard to see in the radiographic image. Furthermore, since the image information in the high frequency range is not emphasized, the noise is reduced and a clear image can be obtained. Consequently, a clear radiographic image full of useful information for diagnosis can be obtained on the final recording material.

Further, according to the inventor's tests it has been confirmed that the combination of the above frequency emphasis and other processing such as changing of the emphasis coefficient $\beta$, the gradation control processing, the image size reduction and smoothing processing further improves the diagnostic efficiency and accuracy in various diseases.

In the above-described embodiments, the radiographic images were recorded through a grid 5 located under the table 4 on which the object 3 is placed. It should be noted, however, that the grid may not be used when the images are recorded by a slit recording method in which slits are inserted between the X-ray source and the object and between the object of the films. The slit recording method will hereinbelow be described referring to FIGS. 9A and 9B.

Figure 9A:
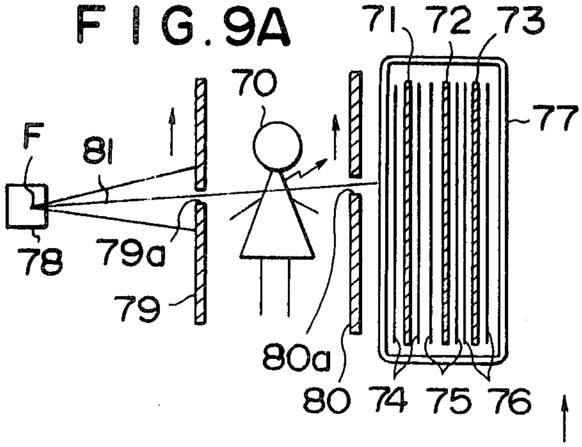
FIG. 9A is a sectional view showing a slit recording method employed in an embodiment of the present invention.

FIG. 9A shows an example of a slit recording method in which films 71, 72 and 73 are stacked together with intensifying screens 74, 75 and 76 of normal type or self-supporting type. The stack of the films 71–73 and the intensifying screens 74–76 is retained in a cassette 77, which is located behind an object 70 to receive X-rays 81 from an X-ray source 78 transmitting through the object 70. Between the X-ray source 78 and the object 70 is provided a first slit plate 79 having a first slit 79*a*, and between the object 70 and the cassette 77 is provided a second slit plate 80 having a second slit 80*a*. The two slit plates 79 and 80 are moved in the same direction synchronized with each other so that the X-rays 81 from the focus F of the X-ray source 78 always pass through the two slits 79*a* and 80*a* and impinge upon the cassette 77 through the object 70 and scan the films 71–73 from one end to the other. The dose of X-rays can be changed either by controlling the anode potential of the X-ray tube of the source 78 or by controlling the speed of movement of the slit plates 79 and 80. The speed of movement of the slit plate 80 located between the object 70 and the cassette 77 is made variable within a range of 10 to 200 cm/sec and the width of the slit 80*a* is made 5 to 50 mm and the depth of the slit 80*a* or the thickness of the slit plate 80 is made 2 to 50 mm, preferably.

Figure 9B:
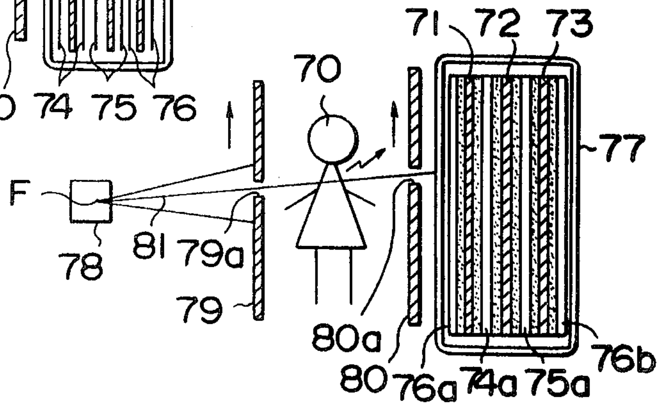
FIG. 9B is a sectional view showing a slit recording method employed in another embodiment of the present invention.

FIG. 9B shows another example of the slit recording method in which films 71, 72 and 73 are stacked together with double-side coated intensifying screens 74*a* and 75*a* and the ordinary intensifying screens 76*a* and 76*b*. All the elements equivalent to those shown in FIG. 9A are designated by the same reference numerals. The structure and operation of the slit recording system shown in FIG. 9B are quite the same as those of the system shown in FIG. 9A, and accordingly the detailed description is omitted here.

Figure 7A:
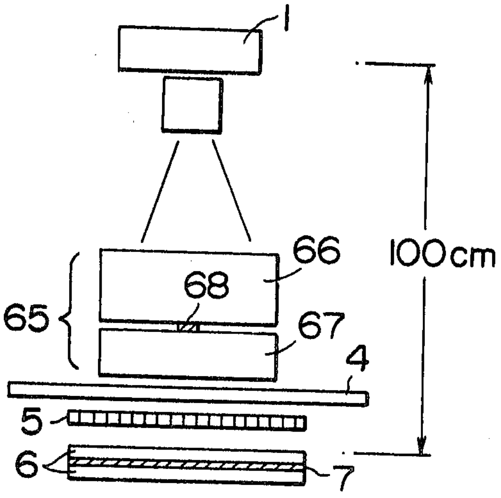
FIG. 7A is a side view showing an image recording system for recording a radiographic image of a model object in accordance with an embodiment of the present invention.
Figure 7B:
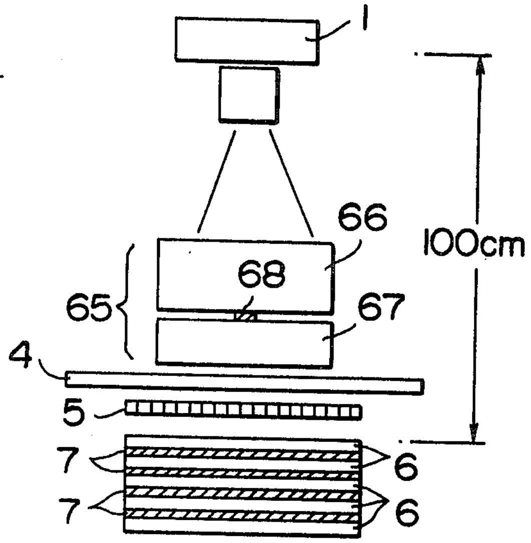
FIG. 7B is a side view showing an image recording system for recording a radiographic image of a model object in accordance with another embodiment of the present invention.
Figure 7C:
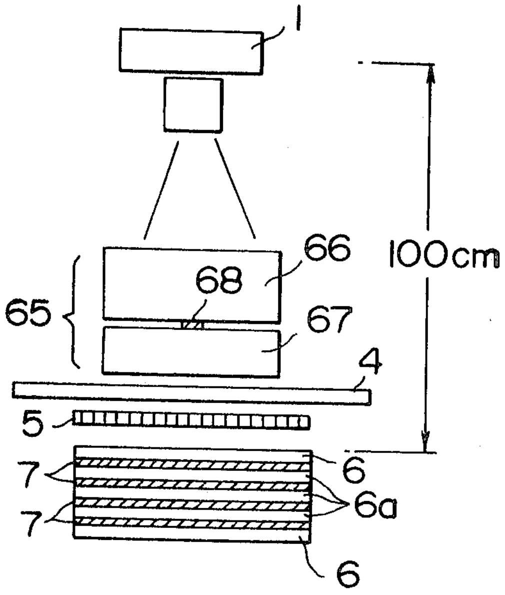
FIG. 7C is a side view showing an image recording system for recording a radiographic image of a model object in accordance with still another embodiment of the present invention.

FIGS. 7A, 7B and 7C are side views showing radiographic image recording systems used for obtaining vaious results of tests according to the preferred embodiments of the present invention. In these systems, a very minute difference in X-ray absorption of the object sample 65 simulating the abdomen of a human body is employed. The object sample 65 of the minute difference in X-ray absorption is composed of a circular Nylon sheet 68 having a diameter of 10 mm and thickness of 0.3 mm interposed between two thick plates of polymethacrylate 66 and 67 having a thickness of 12 cm and 8 cm, respectively. The sample 65 is placed on a table 4, and a grid 5 is located under the table 4 like the recording system as shown in FIGS. 1A, 1B and 1C. In the tests, the distance of the uppermost intensifying screen 6 and the X-ray tube in the X-ray source 1 is made 100 cm. The anode potential of the X-ray tube is made 80 KVp. The arrangements of the films 7 and the intensifying screens 6, 6*a* are shown in FIGS. 7A, 7B and 7C.

By use of the image recording systems as shown in FIGS. 7A, 7B and 7C and also the slit recording systems as shown in FIGS. 9A and 9B and further other arrangements as specified hereinafter, various embodiments of the present invention were tested. The details of the tests and the results thereof will hereinbelow described as Examples with reference to said figures and FIGS. 8A, 8B, 8C, 10A, 10B, 10C and 11.

EXAMPLE 1

By use of the radiographic image recording system as shown in FIG. 7A, 10 films were successively exposed to X-rays. An averaged image information was obtained from the 10 films by a computer processing. Thus obtained averaged image information was used for making a final image in which the gradation or contrast of the averaged image (average gamma was about 2.2) was enhanced to 1.5 to 10 times as high as that of the averaged image. The obtained image was observed by 10 skilled radiologists and the easiness of detecting the image of the Nylon sheet 68 of the sample 65 was examined.

Figure 8A:
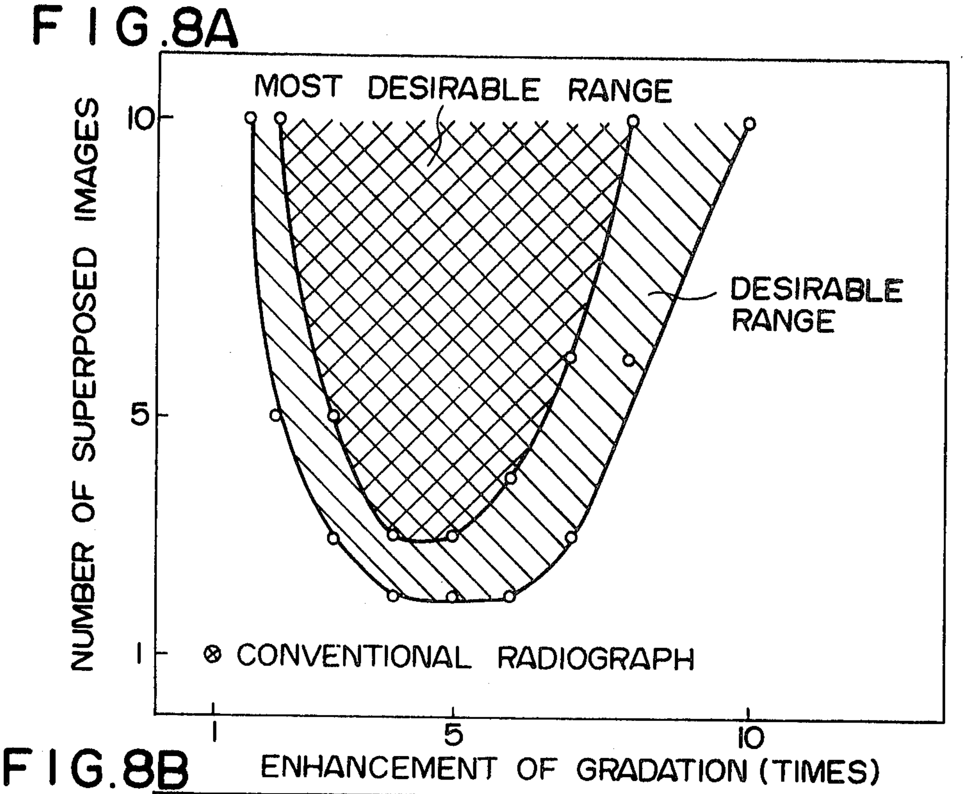
FIG. 8A is a graph showing the results of the method of this invention with respect to the number of radiographic images superposed in accordance with an embodiment of the present invention.

The results were as shown in FIG. 8A. The graph of FIG. 8A was made by plotting the evaluations of images resulting from various combinations of the number of films picked up from said 10 films and the degree of enhancement of gradation performed on the averaged image. The cross hatching range shows the most preferable results and the simple hatching range shows preferable results similarly to FIGS. 6A, 6B and 6C.

From FIG. 8A, the followings can be concluded.

(1) The larger is the number of the images superposed, the higher is the contrast detecting power.

(2) The contrast detecting power is improved by enhancing the gradient of gradation by 2 to 8 times as high as the averaged image.

(3) The contrast detecting power is effectively improved only when the superposition of images to average the image density and the enhancement of gradient of gradation are properly combined. The contrast detecting power is not improved only by performing one of these processings.

It should be noted that said evaluations plotted in FIG. 8A are based on the contrast detecting power to detect the image of the Nylon sheet 68 in the sample 65, and not based simply on the image quality like sharpness, contrast, granularity or the like.

EXAMPLE 2

Similarly to Example 1, 10 films were exposed to X-rays but by the image recording system as shown in FIG. 7B in which self-supporting phosphor sheets were employed. The self-supporting phosphor sheets were made by applying a coating solution uniformly on a substrate coated with Teflon (polytetrafluoroethylene) and horizontally oriented, and the peeled off the substrate after dried. As the coating solution was used a phosphor dispersion as follows:

| | | |
|---|---|---|
| Phosphor: | $CaWO_4$ or $Gd_2O_2S$:Tb phosphor | 8 weight parts |
| Binder: | vinyl chloride-vinyl acetate copolymer resin | 1 weight part |
| Solvent: | methylethyl ketone/toluene = 4/1 | 3 weight parts |

As shown in FIG. 7B and FIG. 2C, radiographic films were sandwitched between self-supporting phosphor sheets. Namely, 10 films were sandwiched between 11 self-supporting phosphor sheets. The five self-supporting phosphor sheets from the uppermost one were mainly made of $CaWO_4$ phosphor, and the other six self-supporting phosphor sheets from the lowermost one were mainly made of $Gd_2O_2S$:Tb phosphor. The thickness of the 11 self-supporting phosphor sheets was, from upper to lower, 90, 120, 160, 200, 250, 130, 160, 200, 230, 270 and 300μ, respectively.

Figure 8B:
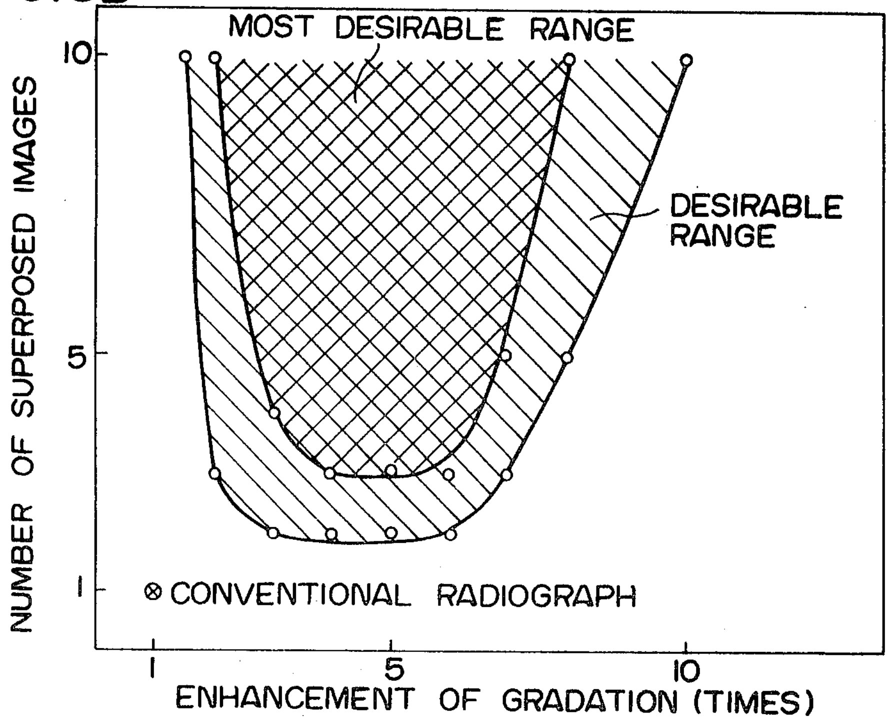
FIG. 8B is a graph similar to FIG. 8A showing the results in accordance with another embodiment of the present invention.

The results obtained by the same process as that of Example 1 were as shown in FIG. 8B. The results provide the same conclusions as those provided by Example 1.

EXAMPLE 3

Similarly to Example 1, 10 films were exposed to X-rays but by the image recording system as shown in FIG. 7C in which double-side coated intensifying screens were employed. The 10 films were sandwitched between a pair of ordinary intensifying screens having a single phosphor layer, and 9 double-side coated intensifying screens were sandwitched respectively between the 10 films in the stack as shown in FIG. 2D. The double-side coated intensifying screens were made by the following process.

A sheet of polyethylene terephthalate having a thickness of 12μ was formed on a horizontally placed glass mirror, and a coating solution having the following composition was applied thereon.

| | | |
|---|---|---|
| Phosphor: | $CaWO_4$ or $Gd_2O_2S$:Tb phosphor | 8 weight parts |
| Binder: | nitrocellulose resin | 1 weight part |
| Solvent: | methylethyl ketone/toluene = 4/1 | 3 weight parts |

Then, the polyethylene terephthalate sheet bearing a dried layer of the phosphor was turned over and the same coating solution was applied on the opposite side of the sheet in the same manner. The thickness of the phosphor layer was controlled for the 9 double-side coated intensifying screens and also for the two ordinary type intensifying screens as follows. The thickness of the phosphor layers for the above-described 11 intensifying screens was, from upper to lower, 70, 70, 70, 100, 100, 110, 110, 130, 130 (all of these layers were made of $CaWO_4$ phosphor), 80, 80, 105, 105, 120, 120, 140, 140, 160, 160 and 180 (all of these are made of $Gd_2O_2S$;Tb phsphor)μ, respectively.

Figure 8C:
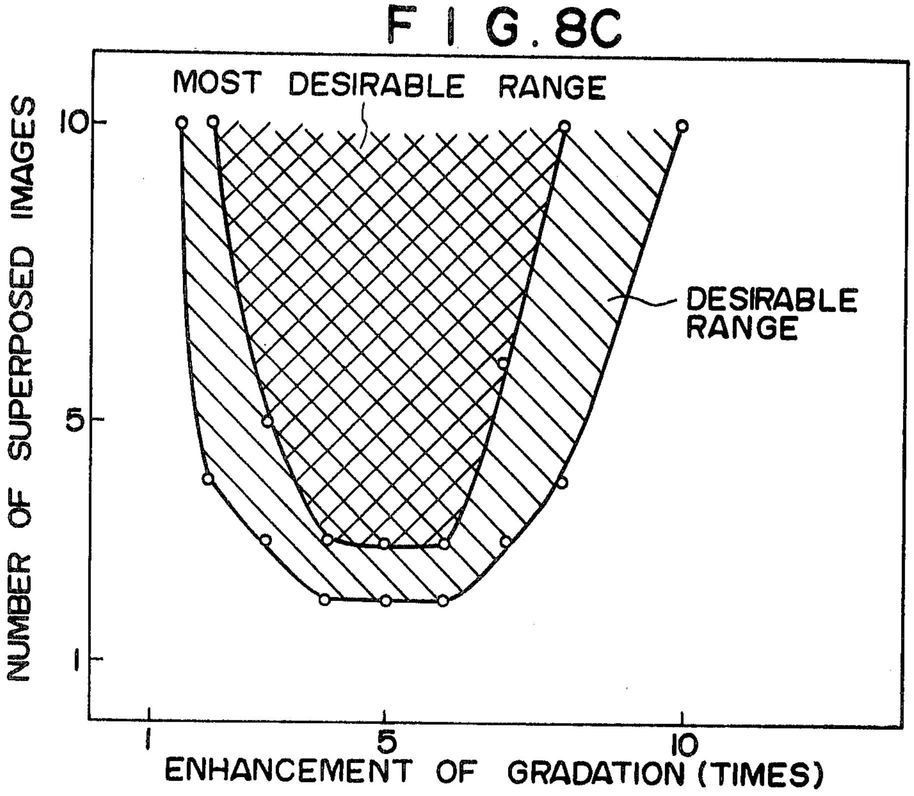
FIG. 8C is a graph similar to FIG. 8A showing the results in accordance with still another embodiment of the present invention.

The results obtained by the same process as that of Example 1 were as shown in FIG. 8C. The results provide the same conclusions as those provided by Example 1.

EXAMPLE 4

In the arrangement as shown in FIG. 7A, the circular sheet 68 interposed between a pair of polyethylene methacrylate plates 66 and 67 was variously changed as a circular Nylon sheet (diameter 10 mm, thickness 0.5 mm and 0.3 mm) and a circular polyethylene terephthalate sheet (diameter 10 mm, thickness 0.18 mm, 0.10 mm, 0.08 mm and 0.06 mm). Thus 7 films were exposed to X-rays as in Example 1 and the gradient of gradation was enhanced to 4 times as large as that of the averaged image.

The results were as shown in Table 3 below in which the signs ++, +, 0 and − mean the degree of clarity of the pattern observed or the contrast detecting power as defined below:

++: The pattern is clearly observed.
+: The pattern is observed.
0: The pattern seems to be observed.
−: The pattern cannot be observed.

TABLE 3

| | Nylon | | Polyethylene terephthalate | | | |
|---|---|---|---|---|---|---|
| | 0.5mm | 0.3mm | 0.18 mm | 0.10 mm | 0.08 mm | 0.06 mm |
| Conventional Method | 0 | − | − | − | − | − |
| Method of Invention | ++ | ++ | ++ | + | 0 | − |

From the resutls as shown in Table 1, the following conclusions can be provided. (1) In the conventional method, the pattern only seems to be observed with the Nylon sheet of 0.5 mm. With a thinner sheet, the images of the Nylon sheet or the polyethylene terephthalate sheet were not observed at all. (2) In the method of this invention, even the polyethylene terephthalate sheet of 0.1 mm was "observed". Thus, the contrast detecting power was markedly improved.

Since the X-ray absorption of the Nylon of 0.5 mm is 1.2% and that of the polyethylene terephthalate of 0.1 mm is 0.3%, it is proved that the contrast detecting power was improved to a level of four times as high as that of the conventional method.

EXAMPLE 5

By use of an automatic continuous X-ray photographing device, 5 radiographic images of abdomen of a human body were recorded at a rate of 2 images per second. The 5 images were superposed and averaged, and then the gradient of gradation was enhanced to a level of four times as high as that of the averaged image. The obtained image was compared with the original image before any processing.

The results showed the above processings were effective to make it possible to clarify the blood vessels of the liver which were not observed in the original image, and also to visualize the adrenal gland.

EXAMPLE 6

In the method similar to Example 1, the 10 films were subjected to a frequency emphasis processing after the superposing processing.

The obtained image was examined in connection with the number of superposed images and the degree of emphasis M defined as $1.2\times\beta+1.0$. The evaluations of the the images thus examined were as shown in FIG. 6A. From FIG. 6A, it was proved that favorable results were obtained over a relatively large range of M.

EXAMPLE 7

In the method similar to Example 1, four films were stacked together with intensifying screens as shown in FIG. 2A. The stack of the films and the intensifying screens was put into a cassette and a tomographic image of abdomen was recorded. The images of the four films were superposed after development processing and the gradient of gradation was emphasized to a level of about four times as high as that of the averaged images. The obtained image showed a very clear contour of internal organs having a very minute contrast and provided markedly high diagnostic efficiency and accuracy.

On the other hand, one of the conventionally obtained images was subjected to a gradation enhancing processing. The resutls were not improved.

Further, after the superposing processing of the four films, unsharp masking processing was conducted with the M of 5.5. With this method also, the image of the organs of very minute contrast was clearly observed and the diagnostic efficiency and accuracy were markedly improved. In this case, particularly linear and granular shades of the image were made clear and effected considerably upon the improvement of the diagnostic efficiency and accuracy.

In this example, the sensitivity of the four sets of intensifying screens stacked together with the four films was increased from the upper one to the lower one as shown in Table 4 below. The intensifying screens were stacked with the films in the form as shown in FIG. 2A in which four films are sandwiched by four sets of intensifying screens. The sensitivity of the uppermost set of intensifying screens is made the lowest and that of the lowermost set is made the highest.

TABLE 4

| Order from above (uppermost one is closest to X-ray source) | Material of phosphor for intens. screen | Relative Sensitivity |
|---|---|---|
| 1 | $CaWO_4$ phosphor | 100 |
| 2 | $CaWO_4$ phosphor | 150 |
| 3 | $Gd_2O_2S$ type phosphor | 250 |
| 4 | $Gd_2O_2S$ type phosphor | 400 |

EXAMPLE 8

In the method similar to Example 2, four films were stacked together with self-supporting phosphor sheets in the arrangement as shown in FIG. 2B. The self-supporting phosphor sheets **41*b* to 44*a* were made by the same process as of Example 2. As the binder was used a nitrocellulose binder. The adjacent self-supporting phosphor sheets such as 41*b* and 42*a*** were bonded together with an adhesive. The material of the phosphor, the thickness and the relative sensitivity of the self-supporting phosphor sheets were as shown in Table 5.

TABLE 5

| Phosphor sheet designated as in FIG. 2B | Phosphor | Thickness ($\mu$) | Relative sensitivity |
|---|---|---|---|
| 41a | $CaWO_4$ | 100 | 1 |
| 41b | $CaWO_4$ | 100 | 1 |
| 42a | BaFCl | 100 | 1.5 |
| 42b | BaFCl | 100 | 1.5 |
| 43a | $Gd_2O_2S$ | 100 | 2.5 |
| 43b | $Gd_2O_2S$ | 100 | 2.5 |
| 44a | $Gd_2O_2S$ | 150 | 4 |
| 44b | $Gd_2O_2S$ | 150 | 4 |

As a result, the response at a spatial frequency of 2 cycle/mm was improved by 10 to 15% as compared with the results obtained by use of the ordinary intensifying screens as in Example 7. Further, when the adjacent sheets **41*b*-42*a*, 42*b*-43*a* and 43*b*-44*a* were bonded together by use of light shielding adhesives, the response was improved by 12 to 16% at the spatial frequency of 2 cycle/mm. When the uppermost and lowermost phosphor sheets 41*a* and 44*b*** were bonded to the substrate, however, there was no change in the results.

EXAMPLE 9

In the method similar to Example 3, four films were stacked together with double-side coated intensifying screens in the arrangement as shown in FIG. 2D. The double-side coated intensifying screens **41*d* to 43*d*** were made by the same process as of Example 3. As the binder was used a polyvinyl alcohol and as the substrate was used a polyethylene terephthalate having a thickness of 125$\mu$.

The material of the phosphor, the thickness of and relative sensitivity of the phosphor layer of the double-side coated intensifying screens were as shown in Table 6.

TABLE 6

| Phosphor sheet designated as in FIG. 2D | Phosphor | Thickness ($\mu$) | Relative sensitivity |
|---|---|---|---|
| 40b | $CaWO_4$ | 100 | 1 |
| 41b | $CaWO_4$ | 100 | 1 |
| 41c | $CaWO_4 + BaSO_4$ | 100 | 1.5 |
| 42b | $CaWO_4 + BaSO_4$ | 100 | 1.5 |
| 42c | $Gd_2O_2S$ | 100 | 2 |
| 43b | $Gd_2O_2S$ | 100 | 2 |
| 43c | $Gd_2O_2S$ | 150 | 4 |
| 44b | $Gd_2O_2S$ | 150 | 4 |

By use of the above arrangement, the films were exposed to X-rays at once and subjected to the superposing processing after developing process like Example 3.

As a result, the response at a spatial frequency of 2 cycle/mm was improved by about 10% as compared with the results obtained by use of the ordinary intensifying screens having a single phosphor layer as in Example 7. Further, when the phosphor layers **41*b* to 43*c* of the double-side coated intensifying screens 41*d* to 43*d*** were adhered to the substrate by use of light shielding adhesives, the response was improved by 12 to 16% at the spatial frequency of 2 cycle/mm.

EXAMPLE 10

In the method similar to Example 2, four films were stacked together with self-supporting phosphor sheets in the arrangement as shown in FIG. 2C. The self-supporting phosphor sheets **46*a* to 49*b* were made by the same process as of Example 2. As the binder was used a vinylchloride-vinylacetate copolymer resin and all the self-supporting phosphor sheets were made into a single layer sheet as shown in FIG. 2C**. The material of the phosphor, the thickness and relative sensitivity of the self-supporting phosphor sheets were as shown in Table 7.

TABLE 7

| Phosphor sheet designated as in FIG. 2C | Phosphor | Thickness (μ) | Relative sensitivity |
|---|---|---|---|
| 46a | $CaWO_4$ | 100 | 1 |
| 47a | BaFCl:Eu | 100 | 1.5 |
| 48a | BaFCl:Eu | 100 | 2.2 |
| 49a | $Gd_2O_2S$:Tb | 150 | 3.5 |
| 49b | $Gd_2O_2S$:Tb | 200 | 6 |

As a result, the response at a spatial frequency of 2 cycle/mm was improved by about 15 to 20% as compared with the results obtained by use of the ordinary intensifying screens having a phosphor layer on a substrate.

However, there was observed no difference even when the uppermost and the lowermost sheets **46*a* and 49*b*** were replaced by ordinary intensifying screens.

EXAMPLE 11

Similarly to Example 8, films and self-supporting phoshphor sheets were put into a cassette, with the sensitivity of the phosphor sheets made different for different sheets. Thus, four tomographic images were obtained and the gradient of gradation of the averaged image thereof was enhanced to the level of about 4 times as high as the averaged image. Thus obtained image showed the organs of very minute difference in X-ray absorption very clearly and had very high diagnostic efficiency and accuracy.

On the other hand, an image obtained by the conventional method was subjected to the gradation control processing. The contrast detecting power, however, was not improved.

Further, said averaged image was subjected to the unsharp masking processing with the degree of emphasis M of 5.5. The image thus obtained also showed remarkably improvements in the contrast detecting power. The organs of very minute difference in X-ray absorption was shown very clearly and the diagnostic efficiency and accuracy were very much improved.

EXAMPLE 12

Quite similarly to Example 11, four tomographic images were obtained but by use of double-side coated intensifying screens in place of the self-supporting phosphor sheets.

The results were quite the same as those of Example 11.

EXAMPLE 13

A slit recording method as shown in FIG. 9B was used employing the arrangement of films and double-side coated intensifying screens as shown in FIG. 2D and Table 6 in Example 9. The obtained images were averaged into a single image.

The response of the image thus obtained was improved by about 10% at the spatial frequency of 2 cycle/mm as compared with the results obtained with the conventional intensifying screens having a phosphor layer on only one surface thereof. Further, the diagnostic efficiency and accuracy of the image were markedly improved as compared with the image obtained by the ordinary recording method in Example 9.

EXAMPLE 14

The arrangement of four films and intensifying screens as shown in Table 4 in Example 7 was exposed to X-rays passing through an object sample as shown in FIG. 7A by use of an X-ray source as used in Example 1 by a slit recording method as shown in FIG. 9A. For comparison, the same arrangement was exposed to X-rays in the manner as shown in FIG. 7A using a grid. Further, a single film sandwiched between a pair of ordinary intensifying screens was also subjected to the same radiographic recording processes using a grid and using slits.

Thus, four samples of images were obtained. The resulting samples were numbered as follows.

Sample No. 1: conventional film arrangement consisting of a single film sandwiched between a pair of ordinary intensitying screens exposed to X-rays by use of a grid (FIG. 7A)

Sample No. 2: film arrangement of this invention exposed to X-rays by use of a grid (FIG. 7A)

Sample No. 3: conventional film arrangement as of Sample No. 1 exposed to X-rays by use of slits (FIG. 9A)

Sample No. 4: film arrangement of this invention exposed to X-rays by use of slits (FIG. 9A)

The obtained images were subjected to a gradation control processing in which the gradient of gradation was enhanced to various degrees. The degrees to which the gradient of gradation was enhanced were represented by magnifications (times) of the gradient. As the object was used to object sample of a Nylon sheet as used in Example 1 shown in FIG. 7A.

The results of the tests were as shown in Table 8 below, in which the evaluations of the results are represented by the symbols as used in Example 4 shown in Table 3.

TABLE 8

| | Degree of gradation enhancement Magnification of gamma (times) | | | | | | | | | |
|---|---|---|---|---|---|---|---|---|---|---|
| Sample No. | 1 | 1.5 | 2 | 3 | 4 | 5 | 6 | 7 | 8 | 10 |
| 1 | − | − | − | − | 0 | 0 | − | − | − | − |
| 2 | − | 0 | 0 | + | ++ | ++ | + | + | 0 | 0 |
| 3 | − | − | − | 0 | 0 | 0 | − | − | − | − |
| 4 | − | 0 | + | ++ | ++ | ++ | ++ | ++ | + | 0 |

From Table 8 above, it is obvious that the contrast detecting power is much improved by the present invention (No. 2 and 4) and that the slit recording method is advantageous in the present invention (No. 4) as compared with the ordinary method using a grid (No. 2) whereas it is not advantageous in the conventional method using only one film (No. 3) as compared with the ordinary method using a grid (No. 1).

EXAMPLE 15

Quite similarly to Example 14, the results of the images obtained by a slit recording method were evaluated. Only one difference from Example 14 was the self-supporting phosphor sheets used together with the films in place of the ordinary intensifying screens. The arrangement of the films and the phosphor sheets was as shown in FIG. 2B. The material of the phosphor of the self-supporting phosphor sheets and the relative sensitivity thereof were as shown in Table 9 below.

TABLE 9

| Phosphor layer designated as in FIG. 2B | Phosphor | Relative sensitivity |
|---|---|---|
| 41a, 41b | $CaWO_4$ | 100 |
| 42a, 42b | $CaWO_4$ | 150 |
| 43a, 43b | $Gd_2O_2S$ | 250 |
| 44a, 44b | $Gd_2O_2S$ | 400 |

The results of the tests were as shown in Table 10

TABLE 10

| | Degree of gradation enhancement | | | | | | | | | |
|---|---|---|---|---|---|---|---|---|---|---|
| Sample No. | 1 | 1.5 | 2 | 3 | 4 | 5 | 6 | 7 | 8 | 10 |
| 1 | – | – | – | – | 0 | 0 | – | – | – | – |
| 2 | – | 0 | 0 | ++ | ++ | ++ | ++ | + | 0 | 0 |
| 3 | – | – | – | 0 | 0 | 0 | – | – | – | – |
| 4 | – | 0 | ++ | ++ | ++ | ++ | ++ | + | + | 0 |

EXAMPLE 16

Quite similarly to Example 14, the results of the images obtained by a slit recording method was evaluated. Only one difference from Example 14 was the double-side coated intensifying screens used together with the films in place of the ordinary intensifying screens. The arrangement of the films and the intensifying screens was as shown in FIG. 2D. The material of the phosphor layers of the double-side coated intensifying screens and the relative sensitivity thereof were as shown in Table 11 below.

TABLE 11

| Phosphor layer designated as in FIG. 2D | Phosphor | Relative sensitivity |
|---|---|---|
| 40b, 41b | $CaWO_4$ | 100 |
| 41c, 42b | $CaWO_4$ | 150 |
| 42c, 43b | $Gd_2O_2S$ | 250 |
| 43c, 44b | $Gd_2O_2S$ | 400 |

The results of the tests were quite the same as those obtained in Example 14 as shown in Table 8 except for the evaluation for Sample No. 2 at the magnification of gamma of 6-times, which was (++) in spite of (+).

EXAMPLE 17

Figure 10A:
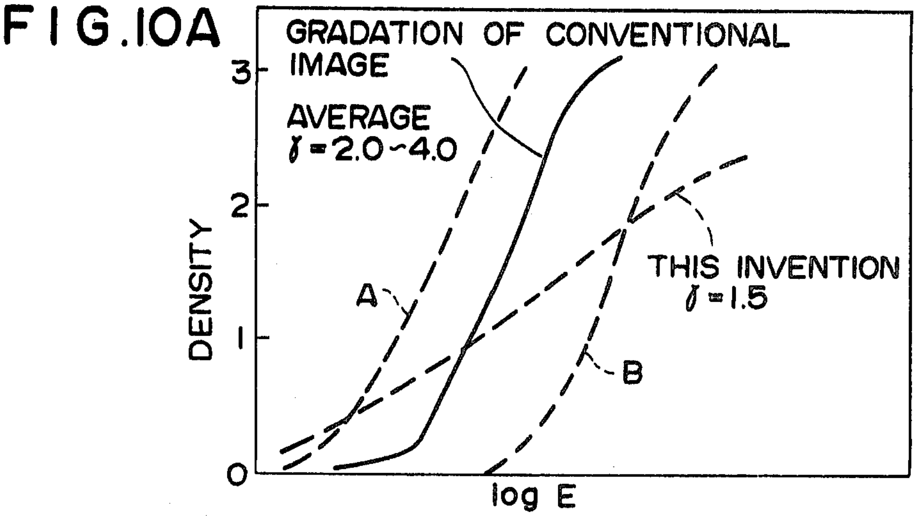
FIG. 10A is a graph showing the characteristic curves of the images obtained in accordance with the present invention in comparison with those of the conventional radiographic images in an embodiment of the present invention.

In place of the films used in Example 14, films of soft gradation having gamma of 1.5 as shown in FIG. 10A were used. By use of the intensifying screens as used in Example 14, four images of a frontal chest were obtained. An averaged image was made from the four images. Based on the averaged image, two images having the characteristics as shown by broken lines A and B in FIG. 10A were made by enhancing the contrast of the low density part and the high density part. Then, further, the gamma thereof was raised up to levels of three to four times as high as that of the averaged image. Thus, two images were obtained based on the four images.

As a result, one of the two images particularly showed the heart and the spine very clearly, and the other showed the blood vessels of the lung considerably clearly.

EXAMPLE 18

Figure 10B:
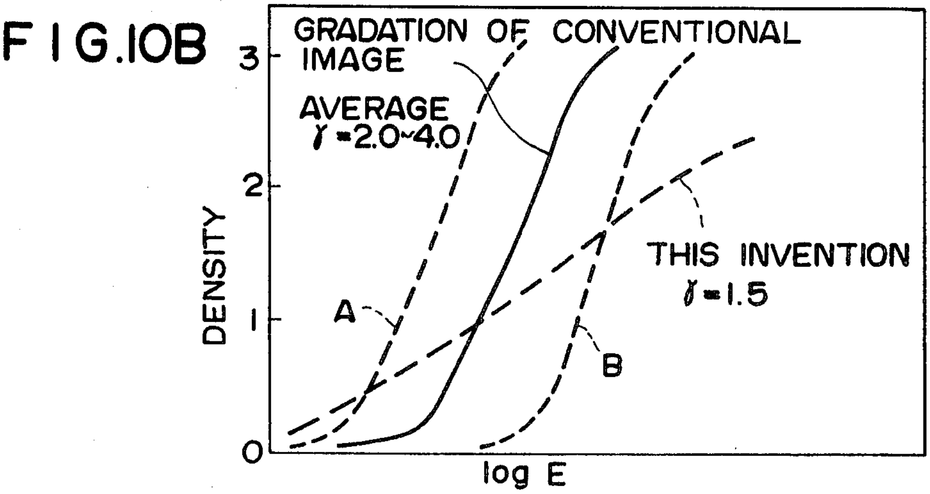
FIG. 10B is a graph similar to FIG. 10A showing the characteristic curves in another embodiment of the present invention.

Quite the same test as that of Example 17 was conducted with the ordinary intensifying screens replaced by self-supporting phosphor sheets and by use of soft gradation films of gamma 1.5 as shown in FIG. 10B.

The results were quite the same as those obtained in Example 17. FIG. 10B should be referred to in this example.

EXAMPLE 19

Figure 10C:
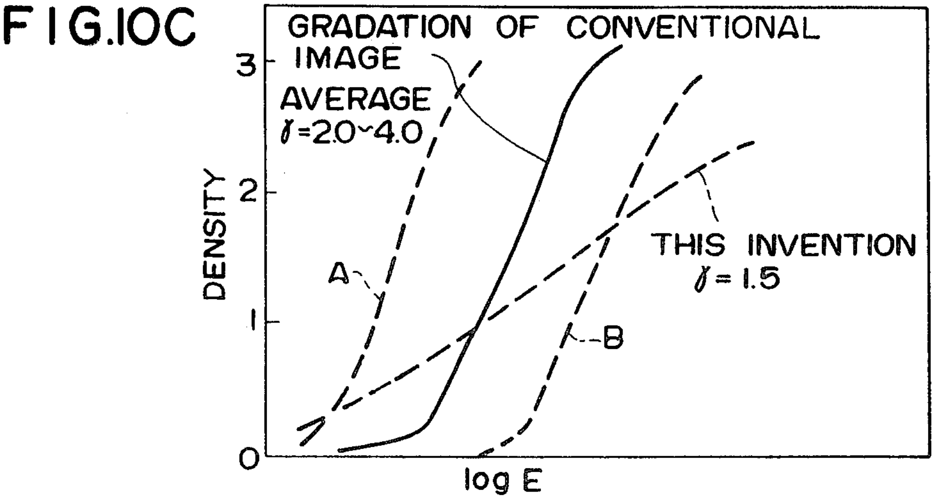
FIG. 10C is a graph similar to FIG. 10A showing the characteristic curves in still another embodiment of the present invention.

Quite the same test as that of Example 17 was conducted with the ordinary intensifying screens replaced by double-side coated intensifying screens and by use of soft gradation films of gamma 1.5 as shown in FIG. 10C.

The results were quited the same as those obtained in Example 17. FIG. 10C should be referred to in this example in connection with the curves A and B.

EXAMPLE 20

By use of the arrangement of films and the intensifying screens as used in Example 17, a frontal chest image was recorded by the slit recording method. After the images of the four films were averaged, the frequency component of 0.01 to 1 cycle/mm thereof was emphasized to the level of 4 to 7 times as high as that of the averaged image.

As a result, an image having a very wide latitude was obtained. Further, in the image thus obtained, (1) the artery in the area of the spine and the blood vessels in the area of the heart which were not observed in the conventional radiographic image were very clearly observed without damaged by the granularity of the film, (2) the lung was generally observed smoothly as compared with the conventional radiographic image and the blood vessels thereof were clearly recognized, and (3) the lung was clearly observed together with the blood vessels of the heart and the spine including the blood vessels which were not able to be recognized in the conventional radiographic image.

EXAMPLE 21

Quite similarly to Example 20, an image of a frontal chest was recorded by use of self-supporting phosphor sheets in place of the ordinary intensifying screens. The frequency component of 0.01 to 1 cycle/mm was emphasized to the level of 6 times as high as that of the averaged image.

The results obtained were quite the same as those obtained in Example 20.

EXAMPLE 22

Quite similarly to Example 21, an image of a frontal chest was recorded by use of double-side coated intensifying screens in place of the ordinary intensifying screens.

The results obtained were quite the same as those obtained in Example 21.

EXAMPLE 23

The tomographic image of the chest was recorded by use of the four sets of intensifying screens and four films as used in Example 17. Then, the spatial frequency component of the averaged image within the range of 0.01 to 1.0 cycle/mm was emphasized up to a level of four times as high as the averaged image. Further, the image was subjected to a gradation control in which the contrast in the low density range of the image as shown by broken line 91 was enhanced as shown by chain line 92 in FIG. 11.

As a result, the blood vessels in the area of the lung which were not clearly observed in the conventional radiographic image because of the too high density thereof were made clearer and the branches and the area therearound were made markedly clear. Furthermore, the granularity of the image due to the various noises around the bronchus was markedly reduced and a very delicated and minute difference in density was made clear as compared with the conventional radiographic images.

EXAMPLE 24

Quite similarly to Example 23, a tomographic image of the chest was recorded by use of four sets of self-supporting phosphor sheets. The results were quite the same as those obtained in Example 23.

EXAMPLE 25

Quite similarly to Example 24, a tomographic image of the chest was recorded by use of five double-side coated intensifying screens. The results were quite the same as those obtained in Example 23.

EXAMPLE 26

Seven sets of intensifying screens of different sensitivity were put into a cassette together with films and exposed to X-rays by the ordinary recording system using a grid as shown in FIG. 1B. Thus, a radiographic image of abdomen was obtained. The material and sensitivity of the seven sets of intensifying screens were as shown in Table 12 below.

TABLE 12

| Order from X-ray source | Phosphor | Relative sensitivity |
|---|---|---|
| 1 | $CaWO_4$ | 100 |
| 2 | $CaWO_4$ | 150 |
| 3 | $CaWO_4$ | 250 |
| 4 | $Gd_2O_2S$ | 400 |
| 5 | $Gd_2O_2S$ | 600 |
| 6 | $Gd_2O_2S$ | 800 |
| 7 | $Gd_2O_2S$ | 1000 |

After the seven images were averaged, the averaged image was subjected to a frequency emphasis to emphasize the frequency component of 0.01 to 1.0 cycle/mm up to the level of 6 times as high as the averaged image.

For the purpose of comparison, the same abdomen was radiographically recorded by a conventional method using a single film sandwiched between a pair of intensifying screens. The intensifying screen was made of $CaWO_4$ as shown in Table 12 and had relative sensitivity of 100. Then, the recorded image was subjected to the same frequency emphasis as that performed above.

As a result, the contour of kidney was clearly recorded and the condition and the shape thereof were sufficiently recognized by the contour, and further the change in mass of the internal tissue of the kidney was clearly observed in the present invention. Thus, the diagnostic efficiency and accuracy were markedly improved.

On the other hand, the latter image obtained by the convertional method showed a vague contour of the kidney with prominent noises of granularity and did not show a recognizable condition of the kidney.

Further, the contour of the liver was also made clear and the blood vessels were easily recognized in the present invention. In the conventional method, however, the image was vague with prominent granularity.

EXAMPLE 27

By use of the films of soft gradation as used in Example 17, a radiographic image of intravenous cholangiogram was recorded by means of an automatic X-ray photographing device at a rate of 2 images per second. Thus, six images of the contrasted gall bladder were obtained. In the recording system, an ordinary grid was used. The six images were averaged similarly to Example 1 and then the frequency of 0.01 to 1.0 cycle/mm was emphasized up to a level of 7 times as high as that of the averaged image.

As a result, the contour of the gall bladder and the biliary duct was clearly observed without damaged by granularity of the film and the delicate difference in mass of the interior of the gall bladder and the biliary duct was clearly recognized.

On the other hand, the areas in which the contrast medium was not injected around the gall bladder and the biliary duct were imaged in a proper density and the density difference based on the difference of the tissue was emphasized and an image of high diagnostic efficiency and accuracy was obtained, though these parts were not easily recognized due to the too high density in the conventional radiographic images.

EXAMPLE 28

By use of the slit recording device as shown in FIG. 9A, simple images of the abdomen were recorded at a rate of one per second. The five images thus obtained were averaged and subjected to a frequency emphasis processing in which the frequency component of 0.01 to 1.0 cycle/mm was emphasized to a level of about 5 times as high as the averaged image.

As a result, the blood vessels of the liver which were not recognized in the conventional method were clearly and sharply observed. The blood vessels were clearly recognized up to the ends thereof. Further, the change of the internal tissue of the kidney which was not recognized in the conventional radiographic image was able to be recognized. In addition, the delicate contour and the condition of the intestines which were not able to be recognized in the conventional method were clearly observed.

I claim:

1. In radiographic image recording system, a method of processing a radiographic image comprising steps of recording radiographic images of an object viewed from the same direction on a plurality of radiographic films, superposing and averaging the images on the plurality of radiographic films to obtain an averaged image having averaged density, and enhancing the gradient of gradation of the averaged image.

2. A method of processing a radiographic image according to claim 1 wherein said radiographic images of an object are recorded on the plurality of radiographic films sequentially.

3. A method of processing a radiographic image according to claim 1 wherein said radiographic images of an object are recorded on the plurality of radiographic films simultaneously.

4. A method of processing a radiographic image according to claim 3 wherein said radiographic images of an object are recorded on a stack of the plurality of radiographic films simultaneously.

5. A method of processing a radiographic image according to one of claims 1, 2, 3, and 4 wherein said images are recorded by a slit recording method.

6. A method of processing a radiographic image in a radiographic image recording system comprising steps of recording radiographic images of an object viewed from the same direction on a plurality of radiographic films, superposing and averaging the images on the plurality of radiographic films to obtain an averaged image having averaged density, obtaining an unsharp mask density Dus corresponding to a super-low frequency of said averaged image, and performing an operation represented by a formula of Dorg+$\beta$(Dorg−Dus) where Dorg is the density of the image and $\beta$ is an emphasis coefficient, whereby the gradient of gradation of the averaged image is enhanced with respect to a frequency component above said super-low frequency.

7. A method according to claim 6 wherein said radiographic images of an object are recorded on the plurality of radiographic films sequentially.

8. A method according to claim 6 wherein said radiographic images of an object are recorded on the plurality of radiographic films simultaneously.

9. A method of processing a radiographic image according to claim 8 wherein said radiographic images of an object are recorded on a stack of the plurality of radiographic films simultaneously.

10. A method of processing a radiographic image accordingn to one of claims 6, 7, 8, and 9 wherein said operation is performed by use of an unsharp mask having a modulation transfer function which falls below 0.5 in the super-low frequency range of 0.5 to 0.01 cycle/mm.

11. A method of processing a radiographic image according to one of claims 6, 7, 8, and 9 wherein said emphasis coefficient $\beta$ is changed according to the original density Dorg of the image or the unsharp mask density Dus of the image.

12. A method of processing a radiographic image according to one of claims 6, 7, 8, and 9 wherein said images are recorded by a slit recording method.

13. A method of processing a radiographic image in a radiographic image recording system comprising steps of recording radiographic images of an object viewed from the same direction on a plurality of radiographic films, superposing and averaging the images on the plurality of radiographic films to obtain an averaged image having averaged density, obtaining an unsharp mask density Dus corresponding to a super-low frequency of said radiographic images on the radiographic films, and performing an operation represented by a formula of Dorg+$\beta$(Dorg−Dus) where Dorg is the density of the image and $\beta$ is an emphasis coefficient, whereby the gradient of gradation of the averaged image is enhanced with respect to a frequency component above said super-low frequency.

* * * * *